US008442898B2

(12) United States Patent
Alsberg et al.

(10) Patent No.: US 8,442,898 B2
(45) Date of Patent: *May 14, 2013

(54) METHODS AND SYSTEMS FOR MARKET CLEARANCE

(75) Inventors: Peter A. Alsberg, Lake Forest, IL (US); Andrew J. Wise, Los Altos Hills, CA (US)

(73) Assignee: Aggregation Commerce, LLC, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/008,218

(22) Filed: Jan. 18, 2011

(65) Prior Publication Data

US 2011/0119172 A1    May 19, 2011

Related U.S. Application Data

(60) Continuation of application No. 12/019,716, filed on Jan. 25, 2008, now Pat. No. 7,895,117, and a division of application No. 09/726,573, filed on Dec. 1, 2000, now Pat. No. 7,349,879.

(60) Provisional application No. 60/169,338, filed on Dec. 6, 1999.

(51) Int. Cl.
*G06Q 40/00* (2012.01)

(52) U.S. Cl.
USPC ............................. 705/37; 705/35; 705/36 R

(58) Field of Classification Search .............. 705/35–37, 705/26
See application file for complete search history.

(56) References Cited

U.S. PATENT DOCUMENTS

| 5,615,269 | A | 3/1997 | Micali |
| 5,794,207 | A | 8/1998 | Walker et al. |
| 6,119,052 | A | 9/2000 | Guenther et al. |
| 6,141,653 | A | 10/2000 | Conklin et al. |
| 6,205,436 | B1 | 3/2001 | Rosen |
| 6,418,415 | B1 | 7/2002 | Walker et al. |
| 6,480,861 | B1 | 11/2002 | Kanevsky et al. |
| 6,598,026 | B1 | 7/2003 | Ojha et al. |
| 6,631,356 | B1 | 10/2003 | Van Horn et al. |
| 6,671,674 | B1 | 12/2003 | Anderson et al. |
| 6,704,716 | B1 | 3/2004 | Force |
| 6,876,983 | B1 | 4/2005 | Goddard |
| 6,952,682 | B1 | 10/2005 | Wellman |
| 7,146,330 | B1 | 12/2006 | Alon et al. |
| 2001/0032162 | A1 | 10/2001 | Alsberg et al. |
| 2002/0143605 | A1 | 10/2002 | Holland et al. |
| 2004/0078277 | A1 | 4/2004 | Gindlesperger |

OTHER PUBLICATIONS

Online documents from www.shop2gether.com, Feb. 29, 2000, from www.archive.org, 4 pgs.
Martin Bicher, et al., Multi-Attribute Auction for Electronic Procurement, Mar. 1999, IBM/IAC Workshop on Internet-Based Negotiation Technology, Yorktown Heights, NY, pp. 1-13.
Bailey, J., and Bakos, Y., An Elploratory Study of the Emerging Robe of Electronoic Intermediaries, International Journal of Electronic Commerce, vol. 1, No. 3, Spring 1997, pp. 7-20.

*Primary Examiner* — Hani M Kazimi
(74) *Attorney, Agent, or Firm* — Edell, Shapiro & Finnan, LLC

(57) ABSTRACT

In a marketplace, offers are processed that are intended to be associated with other offers in a pool. The offers specify conditions for acceptance. Improvable offers are received that are capable of being associated with offers having more favorable specifications than initial offers associated with the improvable offers. Nonimprovable offers that have more favorable specifications than initial offers associated with improvable offers are identified. The identified nonimprovable offers are associated with corresponding improvable offers. Straddles, which comprise a set of offers and a limit on the associations, may span multiple pools. Information about the marketplace may be obtained from data generated by the operation of the marketplace.

31 Claims, 34 Drawing Sheets

| ATTRIBUTE NAME | VALUE |
|---|---|
| COPIES PER MINUTE | > 22 |
| COLLATOR SIZE | = 20 SHEETS |

415 — COPIES PER MINUTE; 420 — > 22; 425 — COLLATOR SIZE; 430 — = 20 SHEETS

410

| ATTRIBUTE NAME | VALUE |
|---|---|
| BRAND | KODAK |
| MODEL | DC280 ZOOM |

445 — BRAND; 450 — KODAK; 455 — MODEL; 460 — DC280 ZOOM

440

| ATTRIBUTE NAME | VALUE |
|---|---|
| UPC | 4177893370 |

475 — UPC; 480 — 4177893370

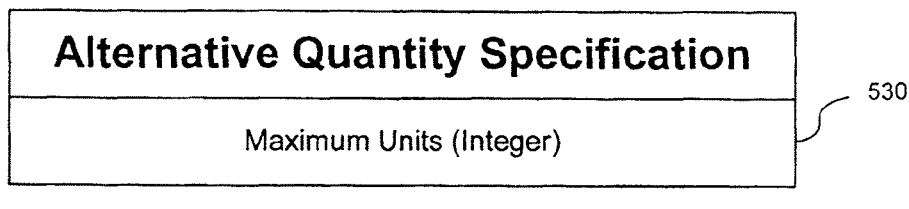
510
520
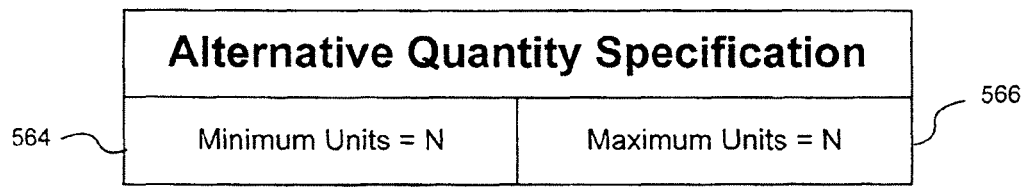
562
Fig. 5

| Alternative Straddle Embodiment | | | | 1015 |
|---|---|---|---|---|
| Straddle ID | | | | 1020 |
| Flags | | | | 1028 |
| Lock Limit Flag 1022 | Active Flag 1024 | Buy or Sell 1026 | Advantaged or Disadvantaged | 1030 |
| Lock Limit Quantity | | | | 1040 |
| Offer List | | | | 1050 |
| Straddle Offer Membership Specification | | | | |
| List of previously-posted Offers | List of concurrently-posted Offers 1054 | Rules for adding subsequently-posted Offers | | 1056 |
| Units or Offers Locked | | | | 1060 |
| Units or Offers Available to Lock | | | | 1065 |

1052 ↦ (List of previously-posted Offers)

1010

| Alternative Straddle Embodiment | | | | 1015 |
|---|---|---|---|---|
| Straddle ID | | | | 1020 |
| Flags | | | | 1028 |
| Lock Limit Flag 1022 | Active Flag 1024 | Buy or Sell 1026 | Advantaged or Disadvantaged | |
| Lock Limits | | | | 1038 |
| Minimum Offers or Units | | Maximum Offers or Units | | 1040 |
| Offer List | | | | 1050 |
| Straddle Offer Membership Specification | | | | |
| List of previously-posted Offers | List of concurrently-posted Offers 1054 | Rules for adding subsequently-posted Offers | | 1056 |
| Units or Offers Locked | | | | 1060 |
| Units or Offers Available to Lock | | | | 1065 |
| Units or Offers Tentatively Locked | | | | 1070 |

1034 ↦ (Lock Limits)
1052 ↦ (List of previously-posted Offers)

Price Schedule

| | Total Qty Transacted | Price | |
|---|---|---|---|
| 1331 | 1 to i | $A | 1334 / 1335 |
| 1332 | i+1 to j | $B (more favorable than $A) | 1336 |
| 1333 | j+1 to k | $C (more favorable than $B) | |

1330

Price Schedule Expressed as Three Advantaged Offers Posted in Order

| Posting Order | | | |
|---|---|---|---|
| 1 | 1342 | Advantaged Offer  1348<br>Reserve Price = $A    Qty = i | 1350 |
| 2 | 1344 | Advantaged Offer  1352<br>Reserve Price = $B    Qty = j-i | 1354 |
| 3 | 1346 | Advantaged Offer  1356<br>Reserve Price = $C    Qty = k-j | 1358 |

Postings

1 — Disadvantaged Sell Offer X — 2310 — No lock
Qty locked = 0 | Price =7 | Qty min = 2 & max = 8

2 — Advantaged Buy Offer A — 2320 — No lock
Unlocked | Reserve Price = 10 | Qty = 1

3 — Advantaged Buy Offer B — 2330 — Locks A & B
Unlocked | Reserve Price = 8 | Qty = 1

Status after 3rd posting:

Disadvantaged Sell Offer X — 2310
Qty locked = 2 | Price =7 | Qty min = 2 & max = 8

Advantaged Buy Offer A — 2320
Locked to X | Lock Price = 7 | Qty = 1

Advantaged Buy Offer B — 2330
Locked to X | Lock Price = 7 | Qty = 1

4 — Disadvantaged Sell Offer Y — 2340 — Unlocks & reocks A
Qty locked = 0 | Price =6 | Qty = 1

— Conflict —

Status after 4th posting:

Disadvantaged Sell Offer X — 2310
Qty locked = 1 | Price =7 | Qty min = 2 & max = 8

Advantaged Buy Offer A — 2320
Locked to Y | Lock Price = 6 | Qty = 1

Advantaged Buy Offer B — 2330
Locked to X | Lock Price = 7 | Qty = 1

Disadvantaged Sell Offer Y — 2340
Qty locked = 1 | Price =6 | Qty = 1

Fig. 23

| Identifiers | | 2420 |
|---|---|---|
| Offer ID 2422 | Pool ID 2424 | Straddle ID 2426 |

| Quantities | | | 2440 |
|---|---|---|---|
| Min Spec 2442 | Max Spec 2444 | Avail to Lock 2446 | Currently Locked 2448 |

Fragment List 2450

| Fragment | Opposite Offer/Frag ID 2452 | Lock Status 2454 | Lock Price 2456 | Quantity 2458 |
|---|---|---|---|---|
| First | Null | Not Locked | Reserve price A | Qty A |
| Second | Offer ID B | Locked | Lock Price B | Qty B |
| Third | Offer ID C | Potential | Lock Price C | Qty C |
| Fourth | Offer ID D | Do not relock | Lock Price D | Qty D |
| ○ ○ ○ | ○ ○ ○ | ○ ○ ○ | ○ ○ ○ | ○ ○ ○ |
| Last | Offer ID Z | Potential | Lock Price Z | Qty Z |

METHODS AND SYSTEMS FOR MARKET CLEARANCE

This application is a continuation of U.S. application Ser. No. 12/019,716, filed Jan. 25, 2008, which is divisional of U.S. application Ser. No. 09/726,573, filed Dec. 1, 2000, which claims the benefit of U.S. provisional application No. 60/169,338, filed on Dec. 6, 1999, all of which are herein incorporated by reference in their entireties.

FIELD OF THE INVENTION

The present invention relates to electronic commerce over a network, such as the Internet or the public telephone network. More specifically, the invention relates to methods and systems for market clearance that aggregate demand and supply in a marketplace and that generate accurate real-time valuable marketplace information.

BACKGROUND OF THE INVENTION

The Internet is a worldwide network of interconnected computers and is gaining acceptance as a medium for facilitating commercial transactions. Many methods used to carry out business transactions via the Internet generally correspond to those used in pre-Internet commerce. Such methods may employ various market-clearing mechanisms within the context of a marketplace.

A marketplace is a location where multiple buyers and multiple sellers transact business. A market-clearing mechanism identifies a buyer and a seller and sets the price for each transaction in the marketplace. The kind of market-clearing mechanism to use for a particular marketplace is largely determined by whether the marketplace serves one or many potential buyers or sellers.

In one type of a marketplace, a single buyer and a single seller attempt to complete a sale. Once the buyer and seller are identified, the only task remaining for the market-clearing mechanism is to set the price. In this situation, the traditional and appropriate price-setting mechanism is one-on-one negotiation, in which the buyer and seller negotiate until they reach a mutually acceptable price or decide not to complete the transaction.

In another type of a marketplace, multiple buyers and a single seller attempt to conduct business. There are multiple potential buyers and only one seller here. Therefore, the market-clearing mechanism must determine the buyer and price. This kind of commerce is fundamentally seller-driven. The seller chooses the product, sets the transaction terms and seeks market venues where it can achieve the highest price. Two common venues are retail sales and auctions, also referred to as "forward auctions," in contrast to "reverse auctions" discussed below.

In an ordinary retail sales setting, a seller offers a specific product at a posted price. Those persons who are willing to pay the posted price may purchase the product, and those who are not willing to pay the posted price may choose not to purchase the product.

In one form of retail price setting that has become popular on the Internet, retailers publish a stepped-price schedule for a product that may be purchased during a period determined by the retailer. Some examples of this type of on-line retailing are Mercata ("www.mercata.com"), MobShop ("www.mobshop.com"), and Volumebuy ("www.volumebuy.com"). These systems implement the traditional retail venue with a pricing twist. The price paid by each buyer is a function of the total quantity of product sold during the purchase period. The price declines as the total quantity sold increases. The primary economic value of this pricing method is that it encourages buyers to recruit other buyers and reduces the customer acquisition costs of the seller. Note that the retailer is motivated to set the pricing steps to maximize its profits, not the buyers' savings. With no competitive bidding among multiple sellers, there is no assurance that the posted price is competitive.

Another venue is an auction in which buyers have a limited bidding period to offer a price for a seller's product. In an auction, multiple buyers bid for the product and the price rises during the bidding period. While bidding may start at a very low price, the seller has the option of setting a "reserve price" below which the seller will not have to complete the sale. The transacting buyers will be those buyers offering the highest prices that equal or exceed the seller's reserve price.

Forward auctions may take various forms, and the specific form of an auction will depend upon the amount of available product and the goals of the seller and the prospective buyers. If there is only one unit of a product, then the single highest bidder will be the only transacting buyer.

When there are multiple available units and multiple potential buyers, variations of the basic auction format may be used. In one popular form, the transacting buyers are the N highest bidders who will consume the available N-unit supply of product. They will each pay their bid price. Thus, different buyers may pay different prices. In another form, known as a "Dutch auction," the transacting buyers are the N highest bidders who will consume the available supply of product and they all pay one price, the lowest price bid by any of the transacting buyers. Auctions can have many variations on these basic themes. The essence of an auction is that multiple buyers bid increasing prices for the products of one seller and that offers to buy and sell are binding upon the buyers and seller.

There is no mechanism in these traditional single-seller auctions to automatically consolidate demand to produce lower prices. Aggregating demand at an auction would raise prices rather than lower them, as increasing demand seeks limited supply. Auctions have become popular on the Internet. Ebay is the current dominant auction site and offers a variety of auctions including Dutch auctions. Ebay can be found on the World Wide Web at URL "www.ebay.com".

When one buyer attempts to do business with multiple potential sellers, a market-clearing mechanism must determine seller and price. This kind of commerce is fundamentally buyer-driven. The buyer chooses the product, sets the transaction terms, and seeks market venues in which it can achieve the lowest price. There are two classes of appropriate mechanisms: a Request for Quotation (RFQ), also referred to as a Request for Price (RFP), and a reverse auction.

An RFQ is an offer to buy that is published to many prospective sellers. Sellers bid for the business. The buyer typically chooses the seller based on price and other criteria. RFQ's may or may not constitute a binding offer to buy. RFQ's and RFP's are popular commerce vehicles for large buyers (e.g., governments and large corporations) who have a sufficiently large order to attract sellers and to justify the cost of publishing the RFQ.

In a reverse auction, multiple sellers bid for a buyer's order and price declines during the bidding period. The transacting sellers will be those sellers offering the lowest prices that are equal to or below the buyer's reserve price (the setting of a reserve price is optional). As is the case with a "forward" auction, the specific form of a reverse auction will depend upon the amount of product desired by the buyer and the goals of the prospective sellers and the buyer. The variations found among reverse auctions are primarily the inverse images of the variations of forward auctions (including the potential for the buyer to set a reserve price above which it will not transact). The essence of a reverse auction is that multiple sellers bid decreasing prices for the business of one buyer and that offers to buy and sell are binding upon the buyer and sellers.

Priceline ("www.priceline.com") is a buyer-driven marketplace that has combined the communications connectivity of the Internet with essential elements of a fixed-price RFQ and a reverse auction to let a buyer name its own price. Priceline primarily creates a market in time-sensitive perishable products. A buyer submits a one-time, binding, fixed-price RFQ at a buyer-determined price. Priceline then could use a reverse auction to find a seller willing to sell at or below the buyer's fixed price. Or Priceline could buy the product at the lowest price available in the market and sells it to the buyer at the buyer's price. Of course, Priceline could also extract a fixed or variable transaction fee instead. Or, these fees could be included in the bid price, effectively reducing the price offered. Notably, these fees are independent of the market-clearing method they have chosen.

Priceline is the seller in a single-buyer, fixed-price RFQ system that has at least three major deficiencies. First, Priceline does not consolidate demand, since it provides product to only a single user at a time. Second, it offers no opportunity to achieve a lower price than the buyer's fixed offering price, should such a price be available in the market. Therefore it motivates postured prices, not the real price a buyer is willing to pay, since the buyer generally bids a lower price than it would actually pay to compensate for the uncertainty, lack of specificity in defining the product (e.g., non-stop-flight or only American or United Airlines), and the cost of a commitment with no market information. Finally, it cannot produce price-elasticity information since systems that motivate postured pricing do not know the true maximum prices buyers would pay. Although Priceline is buyer-driven, it is seller-biased, meaning that transactions are generally priced above the lowest available market price.

If there are multiple potential buyers and multiple potential sellers for a product or service, then a market-clearing mechanism must determine buyer, seller, and price. The traditional market-clearing mechanism used for such marketplaces is a bid-ask exchange mechanism. In a bid-ask exchange, multiple buyers each offer their own binding commitments to buy at their own stated bid prices. Multiple sellers each offer their own binding commitments to sell at their own stated ask prices. The bid-ask exchange mechanism clears a transaction at the bid-ask price when there is a bid price that equals an ask price. If there are multiple bids or multiple asks at the same price, then the exchange must decide which clears first. In less-automated exchanges, this is done by open out cry. In more-automated exchanges, it is done in the order of the time the offer was entered into the exchange. When a bid price is less than an ask price, no transaction clears. When a bid price exceeds an ask price, then the bid-ask exchange mechanism may clear the transaction at some price between the bid and ask price. However, bids do not exceed asks in practice, because the highest current bid and the lowest current ask are usually published. Buyers have no motivation to offer a higher bid than the lowest current ask. Similarly, sellers have no motivation to offer a lower ask than the highest current bid.

A bid-ask exchange is a marketplace where the buyer's offer is a binding offer to buy at a fixed price, and the seller's offer is a binding offer to sell at a fixed price. The buyer offer is essentially a binding fixed-price RFQ that goes to the first seller to meet the fixed price. The seller offer is similar to a retailer's offer to sell at a fixed price. Ultimately, the nature of the commerce that emerges is one-to-one.

The bid-ask exchange is a meeting place where buyers and sellers can efficiently find each other, post prices, and conduct one-to-one transactions. The bid-ask exchange works best for standard commodities where prices do not differ based on fulfillment costs, which could include shipping, tax, insurance, or service contracts. An all-in price is a price that includes all costs (base product, features and options, and fulfillment). All-in pricing can be used to overcome problems introduced by differences in actual cost based on variations in selected options and fulfillment expenses. However, all-in pricing is traditionally not used in bid-ask exchanges. In exchanges such as the NASDAQ stock exchange, commissions are added after prices are set. All-in pricing would include these additional costs.

The present invention overcomes the deficiencies in known market-clearing mechanisms by enabling a new form of multi-buyer, multi-seller exchange that is well-suited to group buying and group selling using demand aggregation and supply aggregation. When used for group-buying, the market-clearing methods and systems of the invention enable otherwise unrelated buyers to aggregate their purchases to create a larger order that sellers can price more efficiently. Sellers then competitively bid for the larger order. When used for group-selling, the market-clearing methods and systems of the invention enable otherwise unrelated sellers to aggregate their inventories to create sufficient supply to meet the needs of a buyer that none of the sellers alone could serve. Buyers then competitively bid for the aggregate inventory.

The present invention enables the creation of an exchange that may be run by a marketplace operator that may be a participant, a third party, or a technology provider. Exchanges consistent with the present invention comprise a meeting place where buyers and sellers can efficiently find each other, make individual offers to buy and sell products with varying attributes at varying prices with varying fulfillment costs, aggregate their collective demand or supply, and produce many-to-many transactions at multiple prices at the same time.

Group buying existed as a form of commerce prior to the emergence of the Internet. For example, group buying has long been used by natural food cooperatives. A natural food co-operative performs important functions for both buyers and sellers. Individual buyers of natural foods may not have an order large enough to economically attract any seller, much less a favorably-priced seller. By pooling their demand, natural food buyers achieve at least two goals: (i) they make it economically attractive for sellers to supply products they desire; and (ii) they get favorable prices in a marketplace e where multiple sellers compete for their business.

Group buying holds promise for significantly increased economic efficiency for buyers and sellers. Group buying enables low-volume buyers to achieve high-volume discounts. Group buying creates larger orders for sellers. A larger order lowers the seller's per-unit cost by enabling the seller to spread fixed costs over more units. At the same time, the increase in units sold creates the potential for greater aggregate profit.

For example, a seller's marketing costs may be constant and represent 10% of the seller's total cost in a typical sale. If market demand would be doubled at a 5% lower price, with no increase in marketing costs, a seller could price its product 5% lower to realize that demand. At a 5% lower price, the seller doubles its sales. By spreading fixed costs over twice as many units, the seller maintains its per-unit profit and doubles its total profit, while simultaneously giving the buyer a significant discount.

Group buying is especially attractive for commerce in products that are relatively standardized, are sold in high volume, have high fixed costs, and have low variable costs. The ability of a group-buying marketplace to realize the economic potential of group buying is proportional to the size of its buying groups. Larger groups create greater benefits for buyers and sellers.

Group buying has not been a widely accepted form of commerce since the improved economic efficiency of group buying was not available to buyers and sellers prior to the existence of a ubiquitous communication mechanism like the Internet. It was too costly for like-minded buyers to find each other and create buying groups. It was too costly for sellers to find and bid for the business of buying groups. The cost of forming large groups was prohibitive.

With the low-cost universal connectivity of the Internet, the barriers to forming buying groups have fallen and group-buying marketplaces have emerged to meet the needs of buyers and sellers. These have taken at lease two forms, including interest it aggregators and demand aggregators.

Interest aggregators aggregate non-binding expressions of buyer interest. Demand aggregators aggregate binding offers to buy. Demand aggregators are of much greater interest to sellers and can produce better prices. For example, if a demand aggregator presents an offer to buy 500 aggregated units of a product, sellers can safely bid aggressive high-volume, 500-unit prices for the product. If an interest aggregator presents a similar non-binding offer to buy, the seller does not know if zero or 500 or some other number of units will ultimately trade. The seller faces the risk of losing money if it bids a low 500-unit price but ultimately transacts materially fewer units. Sellers will normally avoid this risk by offering higher prices that will be profitable even at smaller quantities.

Demandline ("www.demandline.com") is an example of an interest aggregator that pools the demand of multiple buyers, each of whom state its desired purchase price. Demandline personnel then negotiate with a well-known supplier on behalf of the buyer pool to achieve the price each buyer requests. Demandline targets larger purchasers of business products and services for which there are a several major recognized or reputable suppliers, for example, long distance telephone services or retail gasoline.

Examples of demand aggregators include ActBig ("www.actbig.com") and Shop2gether ("www.shop2gether.com"), which target individual purchasers of consumer products and small business purchasers of office products, respectively.

All group-buying marketplaces today have a similar structure. They form groups of buyers of an identical product and solicit sellers to bid for the group order. The group determines a bidding period and typically sets an initial maximum price that all bidding sellers must meet or beat. In essence, the group becomes a single buyer and multiple sellers bid for the entire group's business. This de facto single-buyer, multiple-seller market motivates the use of a reverse auction to determine the winning seller and price.

In the idealized group-buying scenario, a few buyers form a buying group. Sellers bid a lower price for the group order than they would bid for any individual buyer's business. Other buyers join the buying group to take advantage of the lower price. The buying group becomes larger and attracts even lower bids that, in turn, attract more buyers. The result is that the group grows larger and price drops lower during the bidding period.

Unfortunately, this idealized scenario faces four problems that impede the formation of large buying groups and preclude the realization of the scenario. First, the cycle of larger groups and lower prices cannot get started because the reverse auction motivates contrary buyer and seller behavior. Consider the seller's motivation in a reverse auction. The optimal bidding strategy is to make exactly one bid—the last and lowest bid. Sellers have no motivation to bid early. As a result, ever-lower prices are not bid, because sellers wait to bid. Without lower prices, more buyers do not join the group. As a result, buying groups stay small, and no time remains in the bidding period for additional buyers to join when seller bids arrive shortly before the close of the bidding period. Therefore, there is a need in the art for a new market-clearing mechanism that motivates aggressively-priced buyer and seller offers early in the bidding period.

Second, using a reverse auction to clear the market fragments larger groups into smaller groups. To have orderly pricing in a reverse auction, all buyers in a group must buy the identical product under identical terms. Otherwise, the sellers lack a consistent basis on which to bid for the entire group's "single-buyer" order. The requirement for buying the identical product under identical terms forces the buyer of a copier with a 20-sheet collator to be placed in a different group from a buyer of the same copier with a 10-sheet collator. But the seller would have lower overall costs and the buyers could get lower prices if both could be kept in the same group. Therefore, there is a need in the art for a market clearing mechanism that does not fragment groups of buyers of similar but not identical products that could all be supplied by a single seller.

Third, buyers normally exercise individual choice in many dimensions when making a purchase. Ordinarily, buyers choose their own product features and purchase terms. They consider the pricing implications of alternative feature sets and purchase terms and evaluate their available tradeoffs across brands before committing to a specific product purchase. Fewer buyers will join buying groups that do not provide their expected choices and tradeoffs when making a purchase. Many buyers resist the requirement to purchase the identical product under identical terms. Restricting buyer choices and tradeoffs attracts fewer buyers and this results in smaller buying groups. Therefore, there is a need in the art for a market clearing mechanism that preserves buyers' choices, while still enabling them to purchase as a group.

Fourth, there is no good choice for the single price to be used in a reverse auction. If the price is based on the product price alone, then fulfillment costs are outside of the competitive bidding process. In this case, the optimum seller strategy is to bid very low prices for the product and then charge high prices for fulfillment. On the other hand, if the price basis is "all-in," that is, it includes all costs including fulfillment, then sellers are motivated to bid high out of concern that a disproportionate number of buyers may have high fulfillment costs (e.g., delivery costs to distant locations, taxes in local jurisdictions, insurance to buyers with higher risk). It is possible to fragment a buying group into smaller groups of buyers so that all buyers in the smaller group have the same fulfillment costs (e.g., all in one Zip Code). Then sellers can bid their lowest all-in price, because there is no risk of adverse fulfillment costs. But doing so fragments naturally larger buying groups into smaller regional groups that produce smaller orders. The fragmentation precludes the economic benefits that a large order would create for both buyers and sellers. Therefore, there is a need in the art for a market clearing mechanism that allows for variable fulfillment costs within the same group to enable the formation of larger groups with better economics.

At the root of these problems is the use of a market-clearing mechanism that requires a seller to bid a price that applies uniformly to all buyers and that motivates sellers, and hence buyers, to wait until the last minute before making an offer to sell or buy. Reverse auctions, bid-ask exchanges, and forward auctions all have the single-price problem and all tend to discourage early offers by buyers or sellers. A new form of market-clearing mechanism is needed that (i) accommodates variable pricing, including variable all-in pricing; and (ii) motivates both buyer and seller behaviors to create the large groups that maximize the economic efficiency of group buying.

Additionally, a group-buying marketplace can operate more efficiently if sellers know the price elasticity of demand or the committed number of units that will sell at any given price. Accurate price-elasticity information allows a seller to lower its price with the knowledge that the corresponding increase in sales will justify the decrease in price. Also, accurate price-elasticity information allows a seller to avoid needlessly lowering its price when the price reduction will produce insufficient incremental sales to justify the price decrease.

Group-selling marketplaces are attractive to small producers and others who can form cooperatives to share common facilities and to aggregate total supply to attract more or larger buyers. Small agricultural producers of dairy and grain products have historically formed such cooperatives.

Similar to group-buying marketplaces, the Internet also enables the creation of efficient group-selling marketplaces that can efficiently price suppliers' aggregated supply. The issues of forming a group-selling marketplace are similar to those of a group-buying marketplace. Especially relevant is the necessity to (i) allow for variable prices among aggregated sellers in order to form larger groups and produce more efficient pricing for all parties; and (ii) to motivate buyer and seller behaviors that produce earlier offers.

Group-selling marketplaces differ from group-buying marketplaces in that a group-selling marketplace works well for commerce in standardized products that have limited supply, or whose cost of production increases with volume, for example, crude oil, commodity crops, and dairy products.

Bid-ask exchanges, auctions, and reverse auctions only discover the historical demand for products at previously demonstrated transaction prices. They cannot tell buyers and sellers how much product will trade at prices above or below those already demonstrated in the marketplace. Hence bid-ask exchanges, auctions, and reverse auctions cannot give sellers the information they need to determine the economic desirability of bidding prices lower than those previously transacted. But this is precisely the information needed to drive a maximally efficient marketplace.

None of the previously existing forms of a marketplace produce accurate real-time price elasticity for either demand or supply. Market participants normally invest in economic models to predict price-elasticity. Building such models is especially difficult for predicting demand at prices below those historically transacted or for predicting supply at prices above those historically transacted. Systems and methods consistent with the present invention can create accurate price-elasticity information in real-time for demand or supply so that the operation of a marketplace can approach optimal economic efficiency.

SUMMARY OF THE INVENTION

The basic components of a market-clearing mechanism, consistent with the present invention, are offers, pools, straddles, and locks. Market clearing occurs within a pool, which consists of buy offers, sell offers, and a close event. A close event is a specific time or predetermined event, the occurrence of which can be ascertained.

Market-clearing mechanisms, consistent with the present invention, determine buyer, seller, and price by matching buy offers with sell offers in a multi-stage locking process. Offers lock to, unlock from, and relock to each other during an offering period that terminates at the occurrence of a close event for a pool. A pair of locked offers comprises one buy offer locked to a corresponding sell offer. Every locked offer-pair has a lock price determined by the terms of the locked offers and their sequence of locking. At the close of a pool, all locked offer-pairs become transactions at their respective lock prices.

Pools are either buyer-advantaged or seller-advantaged. In a given pool, the lock prices of advantaged offers improve during an offering period. Lower prices are more favorable to buyers and higher prices more favorable to sellers. Thus, in a buyer-advantaged pool, prices locked to individual buy offers decrease during the offering period, as lower sell offers are received. In a seller-advantaged pool, prices locked to individual sell offers will increase during the offering period, as higher buy offers are received. For purposes of the consideration of market-clearing mechanisms consistent with the present invention, it is possible to consider buyer-advantaged and seller-advantaged markets generally. The term advantaged offer ("AO") refers to an offer that corresponds to a buy offer in a buyer-advantaged market or a sell offer in a seller-advantaged market, and the term disadvantaged offer ("DO") refers to a sell offer in a buyer-advantaged market or a buy offer in a seller-advantaged market. Advantaged offers are applied to available disadvantaged offers in the order in which the advantaged offers are received.

Advantaged offers may include a reserve price, which is the least favorable price at which an advantaged offer or is willing to transact. A reserve price is the lowest price at which advantaged sell offers will sell and the highest price at which advantaged buy offers will buy. In a market-clearing mechanism consistent with the present invention, the reserve price serves only the function of determining the first lock of an advantaged offer. Thereafter, advantaged offers may unlock and relock at increasingly more favorable lock prices, and reserve price is not a factor in the locking process after the first lock.

Reserve prices can be either honest or postured. An honest reserve price is the least favorable price at which the offeror is willing to transact. A postured reserve price is a price that is more favorable to the offeror than the offeror's honest reserve price.

Price-setting methods and processes of an embodiment consistent with the present invention have four key properties that motivate honest behaviors by advantaged offerors. First, overall market forces and not individual reserve prices determine the final lock price of an advantaged offer. Second, earlier advantaged offers have first choice at locking the best disadvantaged offers in the pool, because the opportunity to match a favorably-priced disadvantaged offer is granted to advantaged offers in the chronological order that the advantaged offers are received. Third, posting a postured reserve price does not improve the ultimate price at which an advantaged offeror transacts, because it is the timeliness with which an advantaged offer is made that determines how favorable a transaction an advantaged offeror will make, not the amount of a reserve price. Fourth, posting a postured reserve price could cause an offeror to miss an opportunity to transact at a price that is as good or better than the offeror's honest reserve price.

In combination, these attributes strongly motivate advantaged offerors to post their offers early and to do so at their honest reserve price rather than a postured price. And, because market-clearing mechanisms consistent with the present invention create marketplaces with honest reserve prices, these marketplaces produce accurate, real-time price-elasticity curves for advantaged offers.

In accordance with the invention, methods and systems are claimed wherein, in a marketplace, offers are processed that are intended to be associated with other offers. The offers specify acceptable conditions for acceptance. Improvable offers are received that are capable of being associated with offers having more favorable specifications than initial offers associated with the improvable offers. Nonimprovable offers that have more favorable specifications than initial offers associated with improvable offers are identified. The identified nonimprovable offers are associated with corresponding improvable offers. Straddles comprise a set of offers and a limit on the total number of units or offers that may lock across the set of offers within a straddle and may span multiple pools and have dependencies. Consistent with the present invention, information about market parameters, like price elasticity, may be obtained from data generated by the operation of the market-clearing system.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one several embodiments of the invention and together with the description, serve to explain the principles of the invention.

BRIEF DESCRIPTION OF THE DRAWINGS

FIG. 4 is a block diagram illustrating product specifications consistent with the present invention;

FIG. 5 is a block diagram illustrating quantity specifications consistent with the present invention;

FIG. 10 is a block diagram illustrating alternative straddle embodiments consistent with the present invention;

FIG. 13B is a block diagram illustrating the relationship between a price schedule and a corresponding set of advantaged offers posted in order;

FIG. 23 is a block diagram illustrating a potential conflict inherent in the use of min-max-quantity orders;

FIG. 24 is a block diagram illustrating an alternative embodiment consistent with the present invention of an offer including a minimum and maximum quantity specification;

DETAILED DESCRIPTION

Reference will now be made in detail to embodiments consistent with the present invention, examples of which are illustrated in the accompanying drawings. Wherever possible, the same reference numbers will be used throughout the drawings to refer to the same or like parts.

Figure 1:
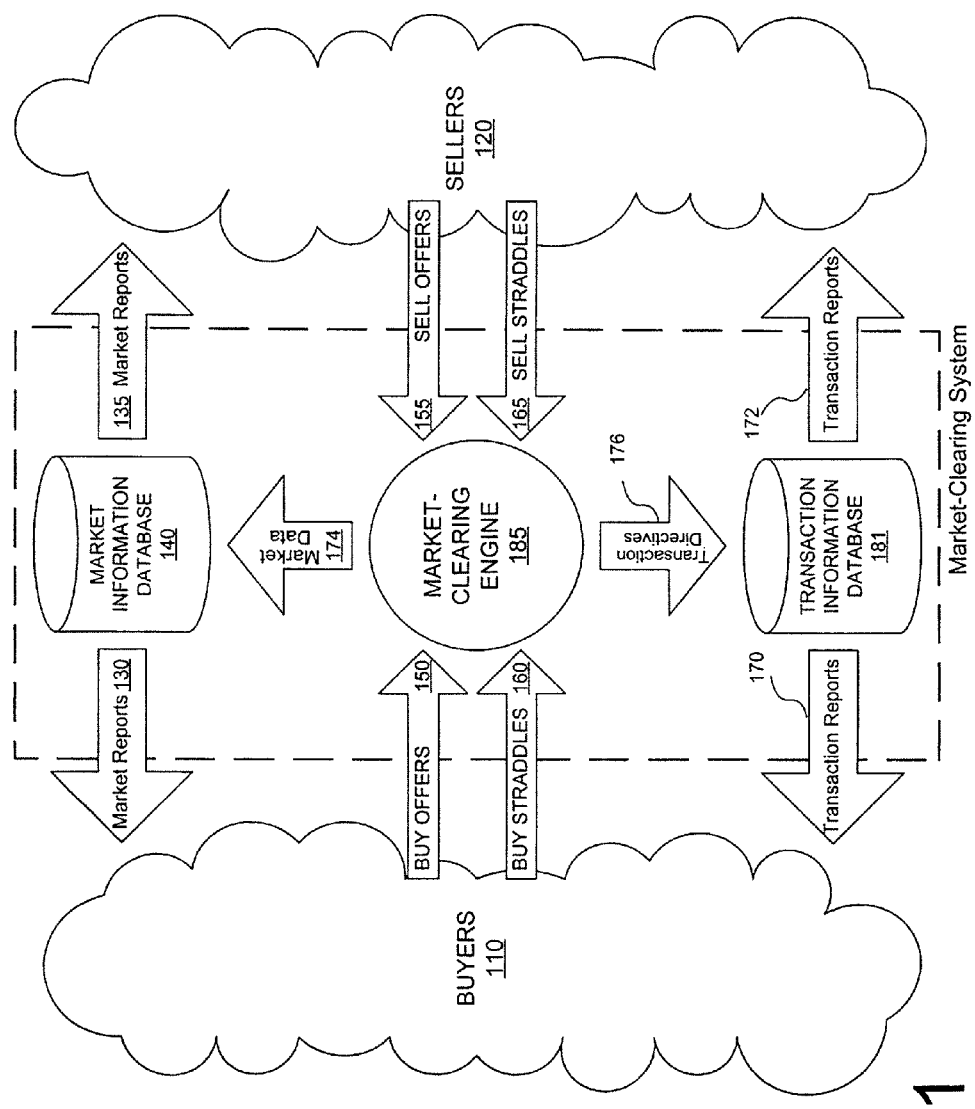
FIG. 1 is a block diagram illustrating a market-clearing system consistent with the present invention.

FIG. 1 is a block diagram illustrating a market-clearing system consistent with the present invention. A set of buyers 110 submits buy offers 150 and buy straddles 160 to the market-clearing engine 185. A set of sellers 120 submits sell offers 155 and sell straddles 165 to the market-clearing engine. Market-clearing engine 185 assigns each offer or straddle to a pool, like the pool described below in connection with FIG. 9, that has a close time consistent with a pool close event. During the period of bidding for each pool, market-clearing engine 185 produces market data 174 that are routed to the market information database 140. This market data may include any information about terms and timing of offers presented to the market-clearing engine, including offeror behavior and timing for an offer or across multiple offers, quantities, product specifications, straddles, and transaction information. At the close of a pool, market-clearing engine 185 produces transaction directives 176 that are routed to the transaction information database 181.

From market information database 140, buyers, sellers, and others extract market reports 130 and 135 that can be used to make decisions about future offers, to formulate development, manufacturing, and marketing strategies and tactics, and to support other business planning and decisions. Buyers and sellers receive reports like transaction reports 170 and 172 that describe their respective transaction obligations resulting from their market participation.

A marketplace operator establishes rules that determine which information may be disseminated in Market Reports 130 and 135 and Transaction Reports 170 and 172. A marketplace operator also defines the terms a receiver must accept in order to receive these reports. Marketplace operators may have varying requirements for information privacy, timeliness, pricing, analysis, dissemination controls, and other attributes of Market Reports 130 and 135 and Transaction Reports 170 and 172.

Figure 2:
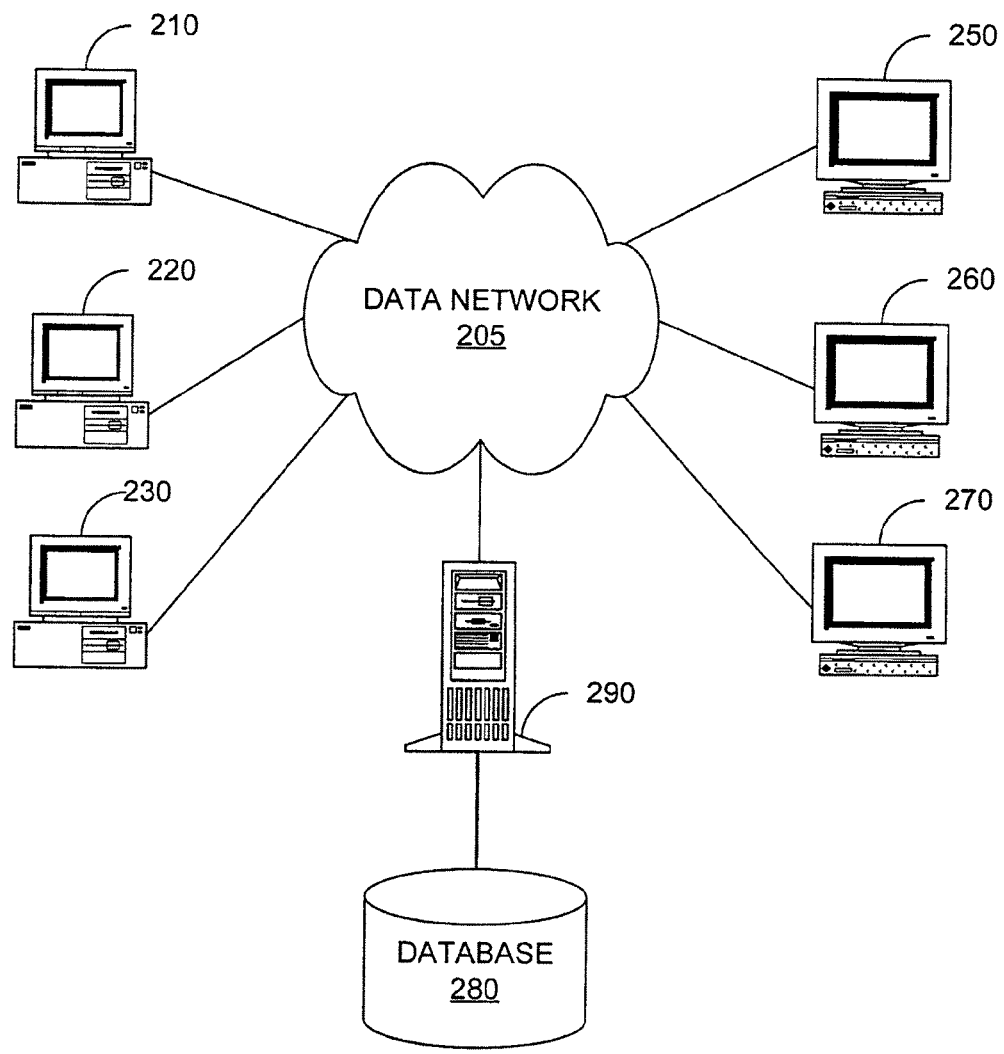
FIG. 2 is a block diagram illustrating a configuration of network devices embodying a marketplace consistent with the present invention.

FIG. 2 is a block diagram illustrating a configuration of network devices embodying a marketplace consistent with the present invention. The marketplace includes one or more buyers who may use network devices such as buyer terminals 210, 220, and 230 to transmit offers and receive market information. Buyer terminals 210, 220, and 230 are connected to and communicate with other terminals via data network 205. Additionally, one or more sellers transmit offers and receive market information on network devices, such as seller terminals 250, 260, and 270, which are also connected to the data network 205. In an embodiment consistent with the present invention, data network 205 is the Internet, thus enabling a global marketplace. In another embodiment, consistent with the present invention, data network 205 is a private network and the marketplace is a private marketplace. In yet another embodiment consistent with the present invention, data network 205 is a call center connected to the public services telephone network, and terminals 210, 220, 230, 250, 260, and 270 are telephones.

Offers are received and processed on one or more network devices such as market clearing server 290. Market clearing server 290 operates a clearance mechanism for the marketplace. In an embodiment consistent with the present invention, offers are recorded on one or more databases, like database 280. Database 280 may be also used to store information produced by the operation of the marketplace, such as accurate real-time price-elasticity data, which may be included in market reports 130 or 135 of FIG. 1.

Figure 3:
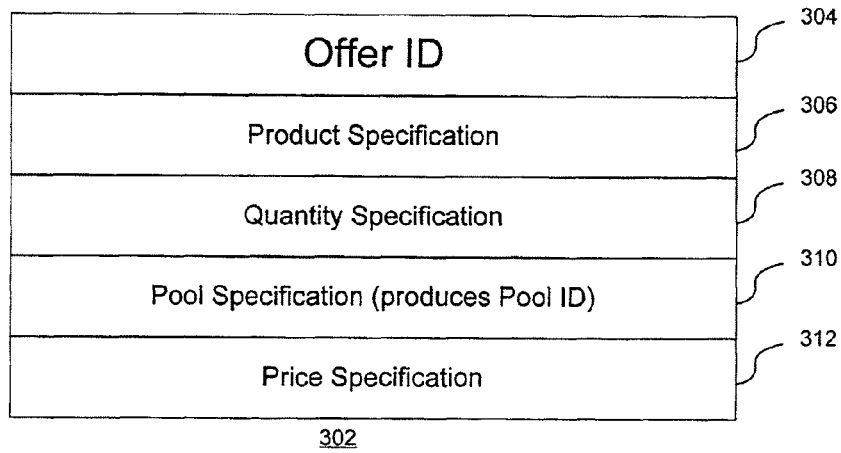
FIG. 3 is a block diagram illustrating the components of an offer consistent with the present invention.

FIG. 3 is a block diagram illustrating the components of an offer, consistent with the present invention. In one embodiment, market-clearing systems use offers, such as offer 302 and associated data structure 322, which correspond to buy and sell offers, such as buy offers 150 and sell offers 155 of FIG. 1. In one embodiment, an offer includes four components: a product specification 306, a quantity specification 308, a pool specification 310, and a price specification 312. For purposes of referencing an offer, offer 302 also includes an offer identifier such as offer ID 304. Product specification 306, quantity specification 308, pool specification 310, and price specification 312 are further described in FIGS. 4-7, respectively.

Data structure 322 provides the offer-related information that is used by the market-clearing engine to change and track the status of offers. The specific data structure 322 could be used in an embodiment that supports a basic quantity specification such as specification 510 (of FIG. 5) and fragmented locking of offers. An offer fragment is a portion of an offer that records the lock status of a part of the offer that applies to, at most, one opposite offer. Straddle ID field 324 is used to associate an offer with a straddle. Pool ID field 326 is used to associate an offer with a particular pool. Locked quantity 328 represents the quantity within the offer that is currently locked to one or more opposite offers. Unlocked or available quantity 330 represents the quantity that remains available for locking to opposite offers.

Fragment list 332 represents a list of fragments corresponding to locks with opposite offers for quantities less than or equal to the quantity specified in the offer's quantity specification. Opposite offer ID identifies the opposite offer if locked, and is null otherwise. Lock status values include not-locked, locked, or do-not-relock, which Means the fragment is currently locked but should not relock if it unlocks. Lock price is the price at which the fragment last locked and null if the product is unlocked (reserve prices and price functions require separate data structures in this embodiment). Quantity is the number of units of product associated with the fragment. The sum of all fragment quantities equals the maximum quantity of the offer. Fragments of advantaged offers are ordered from worst price to best price from perspective of advantaged offeror. The null price is worse than any locked price. No lock price is less favorable than any previous lock price, and fragments at the same price are sub-ordered from newest to oldest opposite offer.

Consider the following example. A sell offer is posted with a quantity specification of 5 units maximum. A first buy offer with a quantity specification of "2 units maximum" locks 2 units of the sell offer's 5 units. A second buy offer locks 1 unit, and a third locks 2. In one embodiment, the information that three buy offers correspond to one sell offer is encoded within the sell offer's data structure using three fragments. When the pool closes, each locked fragment will correspond to a transaction. In this embodiment, the locking process locks fragments, not necessarily entire offers.

In this embodiment, a partially locked offer always has a first fragment that corresponds to the not-yet-locked units in the offer. This is also important to the determination of what constitutes a "locked" offer for the purposes of a straddle that has a lock limit expressed in terms of locked offers. In one embodiment, one locked unit means one locked offer. In another embodiment, an offer is not locked unless all fragments are locked. Other embodiments are apparent to those skilled in the art.

FIG. 4 is a block diagram illustrating product specifications consistent with the present invention. A product specification specifies a product, which may be goods or services, using a standardized system of classification. One classification system consistent with the present invention uses a set of attribute-value expressions, which comprise a name of an attribute of a product and a particular value of that attribute. Attribute-value relationship 410 illustrates a product specification consistent with the present invention. An offeror may specify an office copier as follows: copies per minute>22, and collator size=20 sheets. In this example, the attribute names 415 and 425 are "Copies per minute" and "Collator size," respectively, and attribute values 420 and 430 are "greater than 22" and "equals 20 sheets," respectively. This product specification would match any brand and type of copier that copies faster than 22 copies per minute and that has a 20-sheet collator.

Alternatively, a buyer may specify a single specific product, perhaps using a universal product code (UPC). A product specification, like product specification 470, for a Kodak® DC280 Zoom Digital Camera may be UPC=4177893370, where attribute name 475 is "UPC" and value 480 is "4177893370." A buyer may specify the same product as Brand=Kodak, and Model=DC280 Zoom, in a product specification such as product specification 440. Here, attribute names 445 and 455 correspond to "brand" and "model," and values 450 and 460 correspond to "Kodak" and "DC280 Zoom." In one embodiment, cross-reference indexes provide expanded attributes for a specific UPC with brand-model specifications that match functional product specifications.

A product specification can include the totality of the terms the product must meet. So, for example, a product specification may contain attributes related to the seller or buyer (e.g., location, credit rating) or delivery, payment service rating or any other terms needed to fully define the product being transacted.

FIG. 5 is a block diagram illustrating a quantity specification consistent with the present invention. A quantity specification may include a range corresponding to units of the product as specified in the product specification. A quantity specification that includes both a minimum and a maximum quantity can be referred to as a min-max quantity specification. A range that merely specifies a maximum such as the one in quantity specification 510 has an implicit minimum of one and a maximum such as integer maximum 530. In this case, any number of units up to the maximum may lock if a corresponding opposite offer becomes available. Each unit of product, as specified in the product specification, corresponds to one unit for the purposes of measuring quantities of the product itself. For example, if a product specification identifies lots or cases of 144 items of a product, then each unit of the product corresponds to one lot or case.

In addition to denoting a maximum quantity, min-max quantity specifications, such as alternative quantity specification 520, also denote a minimum quantity of some countable attribute of an offer or straddle that may have to be available across one or more offers before any offer may lock. For example, minimum quantity specifications may express constraints on units of the product of the offer, units lockable on any single opposite offer, number of opposite offers that may be locked, or any other countable attribute of an offer or straddle.

In an alternative embodiment, a quantity specification such as quantity specification 520 may support a minimum and maximum number of units with minimum-units field 532 and maximum-units field 534. In order to lock any units, minimum quantity from one or more opposite offers, in aggregate, must be able to lock the minimum quantity or more of the present offer. A quantity specification may include minimum and maximum numbers of opposite offerors with minimum-opposite-offerors field 535 and maximum-opposite-offerors field 540. This is to facilitate an offeror's request to avoid transactions with too many separate opposite offerors. A quantity specification may also include minimum and maximum numbers of opposite offers with minimum-opposite-offer field 545 and maximum-opposite-offer field 550, which may be used to limit the number of discrete transactions an offeror will accept. Similarly minimum and maximum units fields 555 and 560 may be used to control the size of separate opposite offers that may lock.

Quantity specification 562 illustrates one use of a min-max quantity specification that will cause the offer to lock all or none of a designated number of units. By setting minimum-units-per-opposite-offer 564 equal to maximum-units-per-opposite offer 566, any single opposite offer must lock exactly the specified number of units or no units.

In one embodiment, an offeror may transact with exactly one respondent at one price using an all-or-noting offer. Alternatively, such an offer could be specified as a single lot. An offeror may also transact with multiple opposite offerors provided that the offeror's price criteria are met. In this case, when one offer locks some, but not all of an all-or-nothing bid, other offers must also be immediately available to lock adequate quantity to meet the all-or-nothing criterion. Subsequent offers may cause an unlocking of part of a locked all-or-nothing offer creating situations that may be resolved as described in conjunction with FIG. 23.

Figure 6:
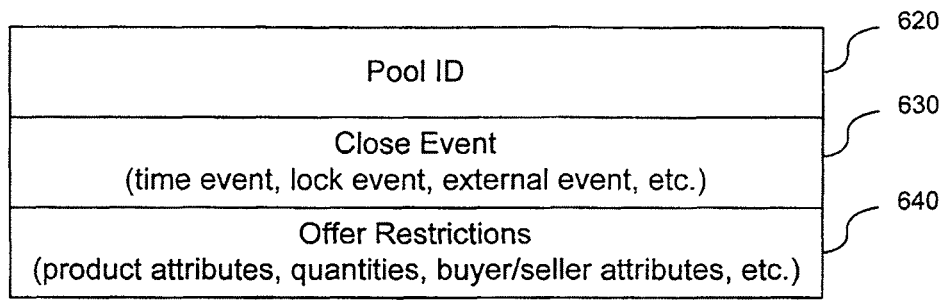
FIG. 6 is a block diagram illustrating a pool specification consistent with the present invention.

FIG. 6 is a block diagram illustrating a pool specification within an offer consistent with the present invention. A single offer is placed into a single pool, and a pool ID, such as pool ID 620, may identify a single pool. Market-clearing systems consistent with the present invention utilize discrete pools with discrete pool close times, where the close times are determined using rules established by the marketplace operator. A pool can be identified by its close event, such as close event 630. A pool close event corresponds to a defined event whose time of occurrence can be determined with precision, for example: 5:00 p.m. PST Wednesday, when 500 offers have locked in this Pool, or 4:00 p.m. GMT on the second day after the last game of the 2001 World Series. A pool specification may also include offer restrictions such as offer restrictions 640. These restrictions may specify offer constraints based on, for example, product attributes, quantities, and buyer and seller attributes. Offers that do not meet these restrictions may not be eligible to join the pool. When a pool specification includes an offer restriction 640, then the pool can be identified by reference to both its close event 630 and its offer restrictions 640.

Individual marketplace operators may use offer restrictions to impose constraints on pool membership. Marketplace operators may have business reasons to organize pools according to buyer, seller, product, or other attributes, in addition to the close time. For example, a marketplace operator may require that all offers in a pool come from a certain category of buyer or seller, or that the offers specify products in the same product category. A category can be as broad or narrow as the marketplace operator wishes. For example, a product category could be office machines or copiers or Xerox® copiers or Xerox small office copiers or Xerox model 4444 copiers or one specific configuration of a Xerox model 4444 copier. Similarly, a buyer category could be used to group buyers on the basis of their creditworthiness, so that credit card payers are in a different pool from major companies with a strong credit rating.

The marketplace operator sets the rules for transforming requested close times in offers into adjusted close times that match the available pool close times in the marketplace. A marketplace operator may adjust requested close times to the nearest available pool close time, to the pool close time immediately before or after the requested close time, or to any other available pool close time by any other rules. The marketplace operator who chooses to organize pools by close time and other criteria, such as, for example, buyer, seller, product, or other attributes, need not have all pools with differing criteria close at the same times.

Pool close times may be varied to meet the business requirements of a marketplace. So, for example, pools targeting small business buyers or sellers may have more frequent close times than pools targeting large business buyers or sellers of the same products.

Figure 7:
FIG. 7 is a block diagram illustrating advantaged offer price specifications consistent with the present invention.

FIG. 7 is a block diagram illustrating advantaged offer price specifications consistent with the present invention. Advantaged and disadvantaged offers handle price specifications differently. In a basic advantaged offer specification, for example, price specification 705, advantaged offers have a reserve price like reserve price 720. A reserve price may be an all-in price, meaning the price includes all additional charges. In some marketplaces it may be desirable for the reserve price to be based on a core product or core product plus options or some other basis that is not an all-in price. A reserve price is a constant and specifies the least favorable price at which the advantaged offeror will transact. A more complex advantaged offer price specification, such as specification 710, may include a reserve price 730 which is similar to reserve price 720. Specification 710 also includes price-weighting function 740 and flag 750. If the price-weighting function 740 is present, then the disadvantaged price is adjusted as specified by the weighting function to determine the preference order in which disadvantaged offers will be locked. The price-weighting function only affects the preference order for locking disadvantaged offers, which offers will lock at a price determined by the locking disadvantaged offer's price function without any modification by the advantaged offer's price-weighting function. The compare-weighted-price flag 750 may be present when a weighting function has been specified. If present, the flag indicates whether to weight the disadvantaged offer's price before comparing it with the advantaged offer's reserve price (if unlocked) or lock price (if locked) to qualify the disadvantaged offer as lockable or not-lockable with the advantaged offer.

Figure 8:
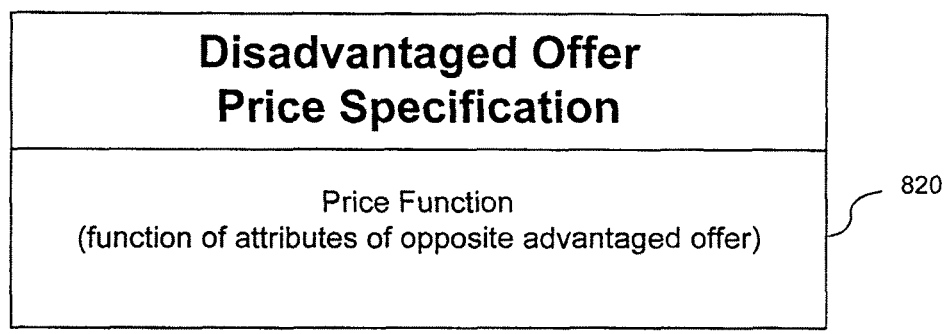
FIG. 8 is a block diagram illustrating a disadvantaged offer specification consistent with the present invention.

FIG. 8 is a block diagram illustrating a disadvantaged offer price specification consistent with the present invention. Disadvantaged offer price specifications, like specification 810, have a pricing function 820. The pricing function is used to calculate an offering price that is a function of the attributes of the opposite offer. Thus, a seller's price in a buyer-advantaged pool may be a function of the buyer's desired good or service, delivery location, time of delivery, insurance, warranty options, service contracts purchased at time of sale, product features and options, means of payment, credit worthiness, and any other attribute on which the seller chooses to base its offering price. A buyer's price in a seller-advantaged pool may be a function of the seller's desired good or service, location, service quality rating, delivery terms, payment options, warranty, and any other attribute on which the buyer chooses to base its offering price.

An embodiment consistent with the invention could allow, for example, sellers in buyer-advantaged markets to post a sell offer whose product specification allows for many different models of a product and to use the sell offer pricing function to quote the correct price for the specific model sought by a specific opposite buy offer.

An alternative embodiment may impose restrictions on price functions to assure that a disadvantaged offer price function always calculates the same price for the same advantaged offer. Such a price function produces an "invariant price" for the same advantaged offer. Embodiments can take advantage of invariant-price functions to calculate price functions once and save the result for later reference rather than repeating the calculation every time a disadvantaged offer's price must be examined. An invariant-price function will, for example, produce prices that are independent of the time, status of a pool, and status of any offer, including the status of the disadvantaged offer itself. With such restrictions, the only way a disadvantaged offeror can change its offering price to a specific opposite advantaged offer is to withdraw its previous disadvantaged offer, subject to any rules against withdrawing locked offers, and to submit a new disadvantaged offer with a different price function. Relaxing these restrictions and using price functions that can produce different prices for the same advantaged offer at different times may introduce greater motivation to posture, may reduce the accuracy of price-elasticity information, and may reduce the economic efficiency of the marketplace.

One restriction on an invariant-price function is that the price function may have no persistent memory between invocations. A price function with no persistent memory has, for example, no knowledge of whether it has ever been previously invoked, no knowledge of the attributes of any offers for which the function was previously invoked to calculate a price, and no knowledge of the results of any previous invocation. Examples of other restrictions include an invariant price function may not access a close time attribute of its pool or a real-time clock attribute or lock status attributes such as the reserve price or lock price attribute of any other offer or the quantity locked by the disadvantaged offer itself or any other offer.

As will be discussed later, invariant price functions do not preclude quantity-driven, stepped-pricing schemes and all-or-nothing offers that require locking on more than one opposite offer in order to lock on any opposite offer. All-or-nothing offers may be implemented by using min-max quantity specifications in an embodiment that allows for minimum aggregate quantities across more than one opposite offer. Straddles of min-max quantity offers can be configured to achieve an arbitrary stepped-pricing schedule.

Furthermore, a marketplace operator may allow contingent offers that are created as a result of events that occur during the operation of the marketplace. For example, a marketplace event such as a lock on one unit or the occurrence of an external event such as a change in interest rates may automatically cause the posting of a new offer, the contingent offer. A more specific example would be provided by a buyer in a buyer-advantaged market who locks a buy offer for one unit of a product and then automatically posts a sell offer for the same product at a $20 higher price to the same or a different pool such as a seller-advantaged pool that closes at a later date. Note that posting a contingent offer does not conflict with invariant-price functions as the contingent offer is a newly posted offer and does not modify any existing, already-posted offer.

Price functions may be implemented in any of several well-established ways. Examples include lookup tables with rows, columns, and, if required, additional dimensions that correspond to attribute values. The tables could also have cells that correspond to price. Interpreted or compiled computer program functions written in Java®, C++, and other computer programming languages could also be readily adapted for use in specifying price functions. Another embodiment may utilize a graphical language that allows users to manipulate graphic elements on a computer screen to compose price functions. Other methods of defining price functions are apparent and available to those skilled in the art.

Figure 9:
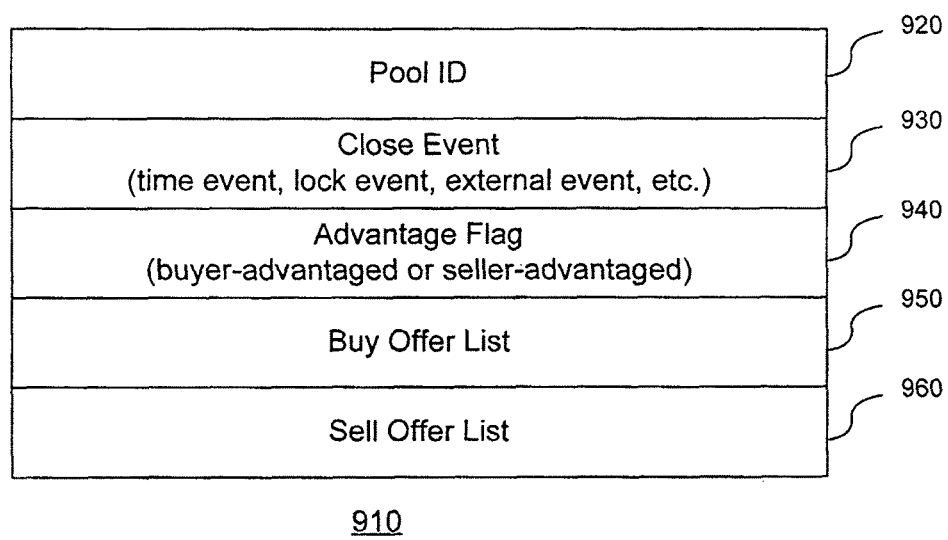
FIG. 9 is a block diagram illustrating a pool consistent with the present invention.

FIG. 9 is a block diagram illustrating a pool consistent with the present invention. Marketplace systems consistent with the present invention can create a marketplace with multiple pools. Each pool is either buyer-advantaged, in which prices tend to decline, or seller-advantaged, in which prices tend to rise. Pool 910 has a pool identifier 920, which is used to reference the pool. A pool is further defined by a pool close event such as event 930, which is any event, the occurrence of which can be ascertained. Pool 910 is further characterized by identifying whether it is buyer-advantaged or seller-advantaged, which may be identified using advantage flag 940. Additionally, pool 910 comprises a buy offer list 950 and a sell offer list 960.

FIG. 10 is a block diagram illustrating alternative straddle embodiments. Straddles comprise a set of offers and a limit on the total number of units or offers that may lock across the set of offers within a straddle. Straddle embodiment 1010 illustrates a straddle with a single lock limit quantity 1030. Embodiment 1080 has minimum and maximum offers or units represented by elements 1034 and 1038 and units or offers tentatively locked 1070 (tentative locks are one means of accommodating locking and specification conflicts of the type illustrated in FIG. 23 that can be created by locking offers with min-max quantity specifications). The rest of the elements are the same throughout the two illustrated alternative straddle embodiments.

Straddle embodiments may include a straddle ID 1015 for referencing the straddle. They may also include flags 1020 such as (i) lock limit flag 1022, which can be set if the lock limit has been reached; (ii) active flag 1024, which can be set if the straddle is active; (iii) buy or sell flag 1026, which is set for buy offers and cleared for sell offers; and (iv) advantaged or disadvantaged flag 1028, which is set if the straddle is advantaged and cleared if the straddle is disadvantaged.

Straddles include an offer list 1040, which is a list of offers that are currently members of the straddle. Alternatively, straddles may include some other mechanism selected by those skilled in the art to identify and locate offers that are currently members of the straddle.

The exemplary straddles 1010 and 1080 also include a straddle membership specification 1050, which defines the rules for straddle membership and include a list of previously posted offers 1052 that are to be members of the straddle upon posting the straddle, a list of concurrently posted offers 1054 that are to be posted as part of posting the straddle, and rules for adding subsequently-posted offers 1056. The straddle membership specification 1050 provides a means to incorporate past, present, and future offers into a straddle. Straddle embodiments may also include a number of units or offers locked 1065 and a number of units or offers available to lock 1065.

The offers in a straddle may span one or more pools. All of the pools spanned by a single straddle must be similarly advantaged, that is all pools must be either seller-advantaged or buyer-advantaged. All offers in a single straddle must be either sell offers or buy offers. Thus a straddle must either be a buy straddle or a sell straddle, and either an advantaged straddle or a disadvantaged straddle.

Offerors use straddles to specify tradeoffs, to buy or sell a limited inventory across one or more pools, and to implement quantity-based price schedules. Advantaged straddles also motivate disadvantaged offerors to make aggressively-priced offers early in the offering period of a pool.

Once the offers in a straddle lock their limit of offers or units, the remaining straddled offers or quantities within those offers are either permanently withdrawn (advantaged straddles) or become ineligible for additional locking until one or more of the straddle's locked units or offers becomes unlocked (inactive disadvantaged straddles).

In the case of advantaged straddles, once an advantaged offer locks, it may thereafter unlock, but only if it is to be immediately relocked on a better-priced disadvantaged offer for the same product. Thus, once an advantaged straddle locks its limit, the straddle's remaining unlocked offers are precluded from locking and may be safely withdrawn and cancelled.

In the case of disadvantaged straddles, a locked offer within the straddle may unlock from its opposite (advantaged) offer because a better-priced disadvantaged offer became available to the advantaged offer. When an unlocking reduces the number of locked units or offers below the lock limit of the disadvantaged straddle, all of the straddle's offers may again become active until a locking occurs that again achieves the lock limit.

For example, an advantaged buyer may use a straddle to attempt to get a good deal on one of three appliances. The buyer submits a straddle consisting of three buy offers. Each buy offer specifies a different brand and model and a reserve price that represents the value of that brand and model to the buyer. Only one of the straddled buy offers may lock. The first sell offer that meets one of the buyer's reserve prices will lock one of the three buy offers. The other two buy offers will be automatically withdrawn and cancelled. In this case, a side effect of withdrawing the offers to buy other brands is that the seller of the locked brand is now assured that the buyer will buy its brand and not a competitor's brand. The sellers competing to sell into this straddle are motivated to offer prices low enough to meet the reserve price for the brand they sell and to do so early, before their competitors.

Once a straddle locks on a product, alternative products are no longer eligible for this buyer's business in this straddle because they are withdrawn. Therefore, a straddle motivates disadvantaged offerors to offer aggressive prices early in the offering period so that they lock before their competitors lock.

An offeror posts a straddle by specifying individual offers of the straddle and their posting order. In an embodiment consistent with the present invention, offerors may specify straddles over already-posted offers, provided the straddle lock limit would not be exceeded by the already-locked units or offers of the already-posted offers. In an embodiment consistent with the present invention, an offeror may specify new offers and an order of posting while specifying the straddle. Posting a straddle causes the new offers to be posted in the specified order. In an embodiment consistent with the present invention, offerors may add offers to already-posted straddles, for example, offers that did not exist when the straddle was originally posted. In an embodiment consistent with the present invention, offerors may post a straddle including any combination of old, new, and future offers or straddles. In the case where one allows straddles of straddles, alternative embodiments include posting an equivalent single straddle of offers with no embedded sub-straddles and providing mechanisms to continue to maintain the identity of embedded straddles.

In the case of straddling already-posted offers, the chronological order, or timestamp, of the already-posted offers is not changed. Any additional new offers posted with a straddle have their order specified by the straddle offeror before posting the straddle. Any offers posted after the straddle has been posted and that are to be incorporated within the straddle have their order determined by their time of posting.

Posting a straddle that itself contains new offers is normally a non-interruptible posting operation. That is, in market-clearing engines consistent with the present invention, once the engine begins to post the offers of a straddle, it will post all of the new offers in the straddle before it posts any new offers that are not part of the straddle.

When a pool closes, all of the unlocked offers in the pool are withdrawn and cancelled as part of the closing process. This action can affect a straddle that straddles a closing pool and one or more pools that remain open. At pool close, a non-interruptible straddle clean-up process is performed. No offers can be posted until the straddle clean-up process is completed.

For each offer withdrawn as a result of closing the pool, the market-clearing engine determines whether it is a member of a straddle. If so, the market-clearing engine reduces the straddle lock limit of the straddle of which the withdrawn offer is a member. The straddle lock limit is reduced by the number of locked units of the withdrawn offer, or by one offer if the withdrawn offer is locked and the straddle lock limit is specified as a number of offers rather than a number of units.

Figure 11:
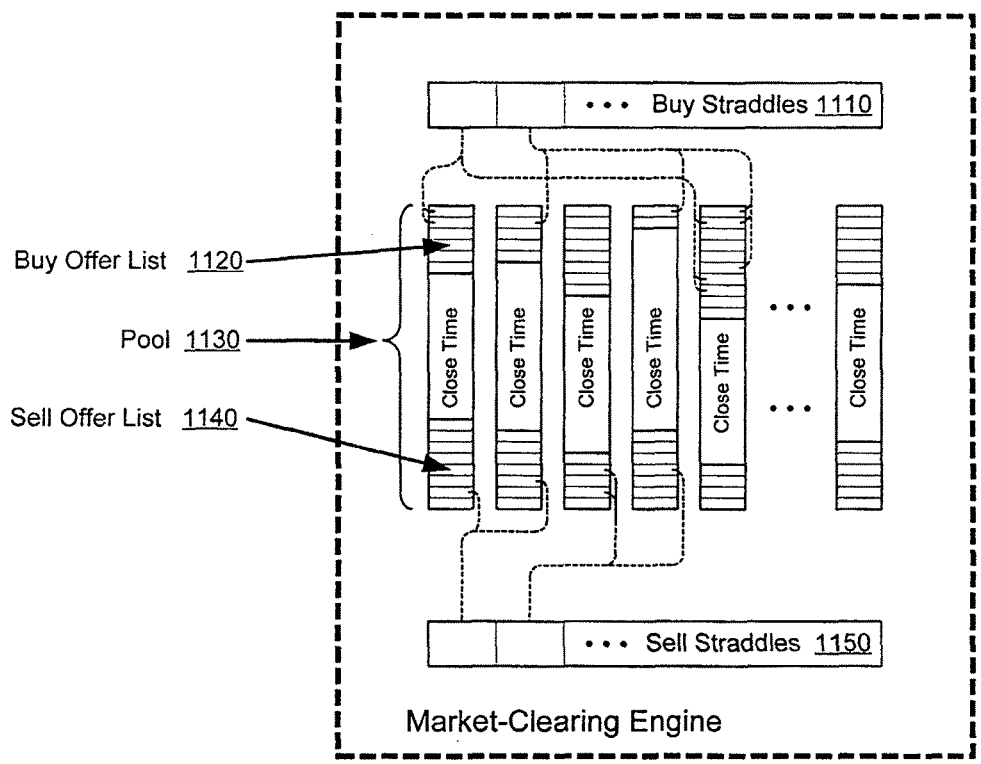
FIG. 11 is a block diagram illustrating a relationship consistent with the present invention between exemplary offers, pools, and straddles.

FIG. 11 is a block diagram illustrating a relationship consistent with the present invention between exemplary offers, pools, and straddles. Each Pool 1130 consists of a close time, or close event, a buy offer list 1120, and a sell offer list 1140. Buy straddles 1110 and sell straddles 1150 limit the number of offers or the number of units that can lock across multiple offers that may be in multiple pools. The market-clearing engine manages straddles independently of any single pool. Market-clearing mechanisms consistent with the present invention place no limits on offers in a pool other than the requirement that all offers must share the same adjusted close time. However, business considerations may lead marketplace operators to themselves impose additional limitations on pool membership.

The closing time of the pool is the closing time of the bidding period, and may be defined by the marketplace operator, by the offerors, or by any other mechanism acceptable to the marketplace operator to establish a closing time. Marketplace operators may adjust close times to fit patterns (example, adjusted close times every half hour) or allow them to close at unadjusted times. Embodiments consistent with the present invention may only allow close times whose occurrence is known and fixed at the initialization of the pool. Other embodiments consistent with the present invention may accommodate close times that may not be known with certainty during the bidding period but will be known with certainty upon their occurrence. For example, in one embodiment, a close event may be defined as the locking of a certain number of units in the pool, or the passing of a specified amount of time with no new offers being posted, or the announcement of a rate change by the Federal Reserve Board. Close times can be set to correspond to the arrival of any specific event or combination of events.

Figure 12:
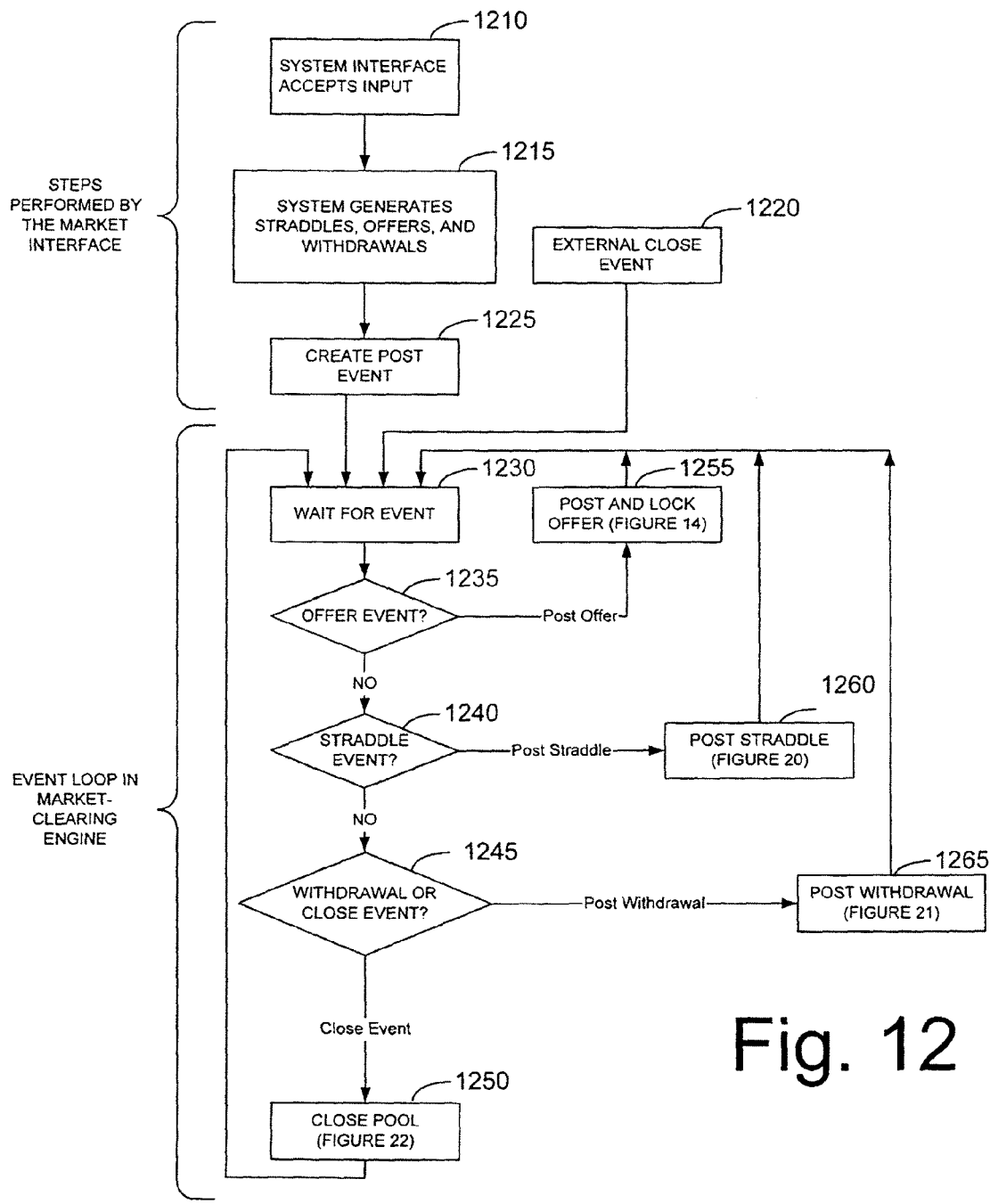
FIG. 12 is a flow diagram illustrating a market-clearing mechanism consistent with the present invention.

FIG. 12 is a flow diagram illustrating a market-clearing mechanism consistent with the present invention. A system interface of the market-clearing mechanism accepts inputs from offerors and a marketplace operator (step 1210). Based on the input, the market-clearing mechanism generates straddles, offers, and withdrawals (step 1215). Once the straddles, offers, and withdrawals are generated, a post event is generated (step 1225). Additionally, an external close event may occur (step 1220). At this point, the market-clearing mechanism enters an event loop (step 1230). Next it is determined whether an offer event has been generated (step 1235). If an offer event has been generated, the offer is posted and locked as further described in FIG. 14 (step 1235). The event loop is completed and starts again.

If an offer event was not generated, it is determined whether a straddle event was generated (step 1240). If a straddle event was generated, then the straddle is posted to the marked-clearing mechanism as further described in FIG. 20 (step 1260). The event loop is completed and starts again.

If a straddle event was not generated in step 1240, it is determined whether there was a withdrawal or close event (step 1245). If a withdrawal event was generated, then the withdrawal is posted to the system as further described in FIG. 21 (step 1265). Finally if a close event was generated, then the pool is closed as further described in FIG. 22 (step 1250) and the event loop starts from the beginning at step 1230.

The primary functions performed by the market-clearing engine include initializing pools, posting offers to pools, sequencing offer lists, matching offers, locking and relocking offers, tracking the lock status of straddled offers, and closing pools. The post and lock process within the Market-Clearing Engine is described in FIG. 14.

Figure 13:
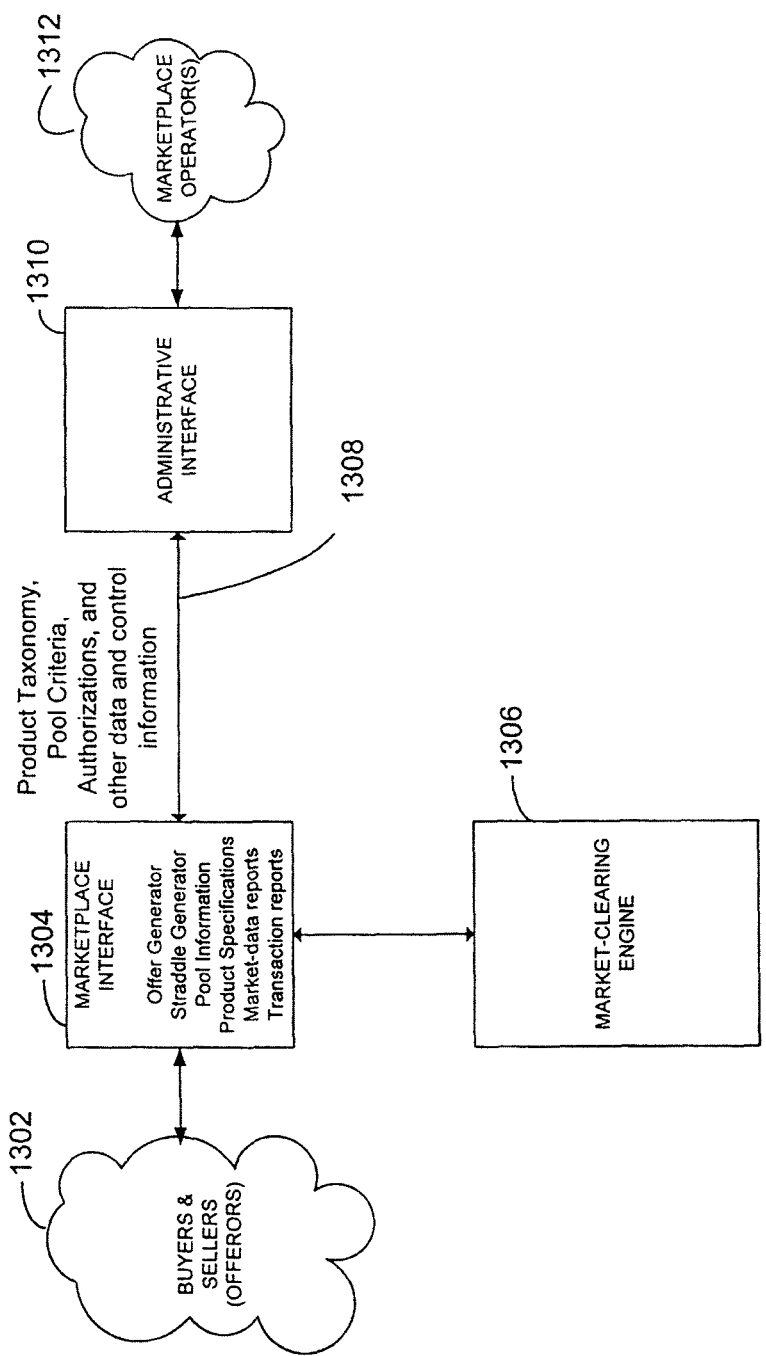
FIG. 13 is a block diagram illustrating a relationship consistent with the present invention between offerors, system interfaces, and marketplace operators.

FIG. 13 is a block diagram illustrating a relationship consistent with the present invention between offerors, system interfaces, and marketplace operators. Buyers and sellers 1302 communicate with marketplace interface 1304 that provides the functionality of an offer generator, a straddle generator, a provider of pool information, product specifications, market-data reports, and transaction reports. Marketplace interface 1304 and administrative interface 1310 interact with each other through connection 1308. Marketplace Interface 1304 communicates with market-clearing engine 1306, transmitting offers and straddles as generated by the offer generator. Product taxonomy, pool criteria, access authorization, and other data and control information are exchanged as needed to enable the operation and enforce the rules of the marketplace. Finally, administrative interface 1310 is the interface used by marketplace operators 1312 to interact with the market system. One marketplace may have multiple operators, and that the operators of multiple marketplaces may collaborate so that they share some pools in common to achieve larger pool sizes than any of the single collaborating marketplaces could achieve.

Market-clearing engines 1306, consistent with the present invention, exist within a marketplace system that determines pool criteria, enables buyers and sellers to define straddles, supplies the events that signal the close of a pool, and provides the market-clearing engine with offers to post to pools and to then compare and lock with other offers in the same pool. A market-clearing engine also manages related transactions, including withdrawals, straddles, and reporting.

Figure 13A:
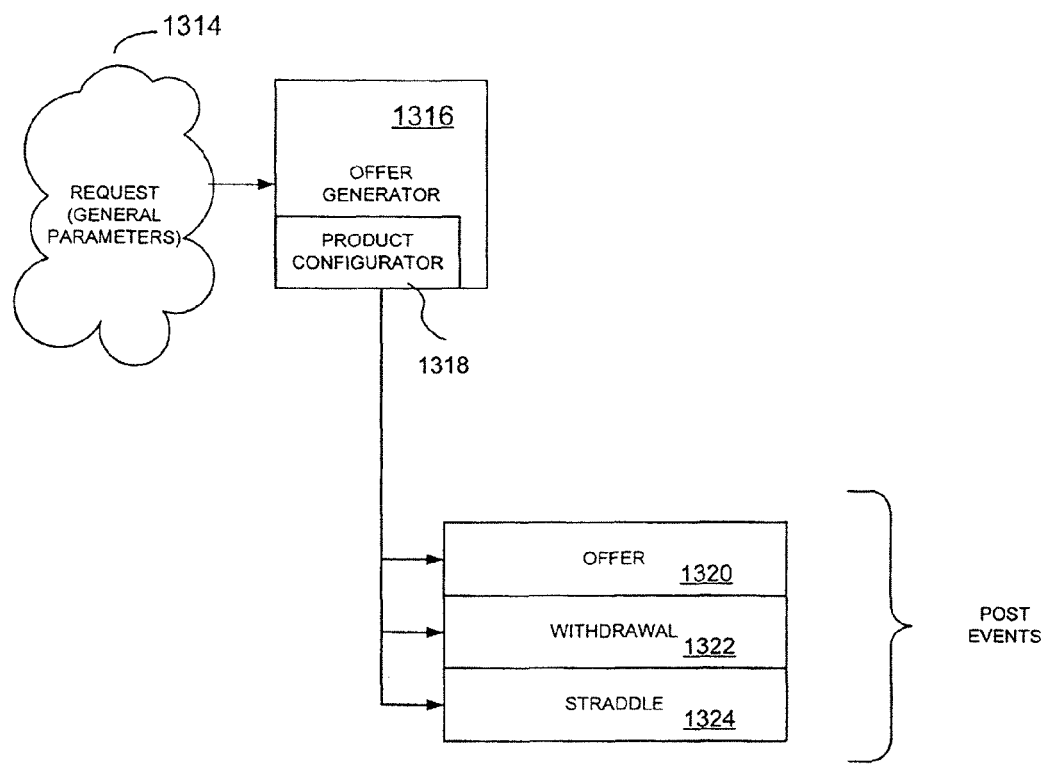
FIG. 13A is a block diagram illustrating a process, consistent with the present invention, of accepting requests and generating offers, straddles, and withdrawals.

FIG. 13A is a block diagram illustrating a system, consistent with the present invention, of accepting requests and generating offers, straddles, and withdrawals. The basic input to offer-generating systems comprises requests 1314, which are made up of general parameters. These general parameters may take the form of a list of products that an offeror is willing to buy or sell at particular prices and the conditions under which the offeror wishes to generate an offer. Requests also may be provided in free text, from a menu, or from other input mechanisms selected by the marketplace operator. Requests 1314 are accepted by offer generator 1316, which may include a product configurator 1318, capable of converting generalized product information into a standardized product specification (FIG. 4). Requests may be specified as "fill or kill," which will cause the offer generator to generate an offer and withdrawal combination that will allow the posted offer a brief time to lock or a single attempt to lock (one possibly interruptible pass against all opposite offers), and if it does not lock, it will be withdrawn. Another possible request generates an all-or-nothing offer, which as described in connection with FIG. 5, results in an offer with a min-max quantity specification where the minimum equals the maximum.

Another request generates a "fill and withdraw" offer, which is an offer combined with a withdrawal that allows an offer to lock as many corresponding opposite units in a brief time or in one attempt, and once that is done, to withdraw any unlocked available quantity. Another request generates a "stepped quantity," as will be discussed in conjunction with FIG. 13B.

Next, offer generator 1316 takes the standardized specifications and associated prices from requests 1314 and generates either at least one offer such as offer 1320, or at least one withdrawal 1322, or at least one straddle 1324, depending on the nature of the requests. Withdrawals may be posted alone without corresponding to fill-or-kill or fill-and-withdraw. Implementing fill-or-kill and fill-and-withdraw as a one pass single-shot uninterruptible attempt requires minor adjustments to the market-clearing engine, but it is obvious to one skilled in the art how to implement the minor modifications. The modifications involve the addition of a one-pass offer flag in the offer specification. At the end of the compare and lock process for that offer, one does an uninterruptible immediate withdraw of any unlocked quantity.

FIG. 13B is a block diagram illustrating the relationship between a price schedule and a corresponding set of advantaged offers posted in order.

Market-clearing mechanisms consistent with the present invention may also include step pricing, as illustrated in price schedule 1330. Step-priced offers set prices based on aggregate quantity sold to many buyers or purchased from many sellers. A buyer may submit an offer for one unit if the price is $10 and a total of three units if the price is $8 for all units. Similarly, a seller can offer one to five units at $10. If six to twenty units are purchased by all buyers, the price for all units is $8 each. The basic form of a stepped offer is illustrated in price schedule 1330. The total quantity to be transacted is: (i) 1 to i total units (cell 1331) at $A each (cell 1334); (ii) i+1 to j total units (cell 1332) at $B each (cell 1335); and (iii) j+1 to k total units (cell 1333) at $C each (1336).

In the case where prices are monotonically improving from step to step, an advantaged offeror's stepped-price schedule can be expressed as three advantaged offers posted in order, as illustrated by the offer set 1340. First, advantaged offer 1348 is posted with a reserve price of $A (cell 1342), and a maximum quantity of i (cell 1350). Second, advantaged offer 1352 is posted with a reserve price of $B (cell 1344) and a maximum quantity of (j-i) (cell 1354). Third, advantaged offer 1356 is posted with a reserve price of $C (cell 1346) and a maximum quantity of (k-j) (cell 1358). The orders are posted in the order of increasing aggregate quantity and increasingly favorable price (to the advantaged offeror). This method works because any later offer cannot lock unless all earlier offers, each of which has a less favorable reserve price, have locked. As all earlier offers achieve a lock price that equals or betters any later offer, the offeror is assured that all prices of all locked units are at least as favorable at the latest locked offer.

One simple way of providing an approximation to a quantity-driven stepped-price schedule for disadvantaged offers is to post a conditional offer when sufficient advantaged offers have been posted in a pool to justify a higher-quantity price. One then posts a new offer at the more favorable price and withdraws the earlier offer and straddles both the old and the new offers. This requires that the withdrawn offer be set to do-not-relock and that the new offer be placed in a straddle that allows locks to the new offer when the new lock displaces a lock to the old offer. This method does not guarantee a faithful implementation of the stepped-price quantity schedule. For example, some advantaged offers that were not locked to the withdrawn offer may be first in line to lock on the new offer, with the result that some locks remain with the old offer at the old price. Providing for more faithful implementation of disadvantaged offer stepped-price schedules requires a different mechanism such as that discussed in relationship to FIG. 13C.

Figure 13C:
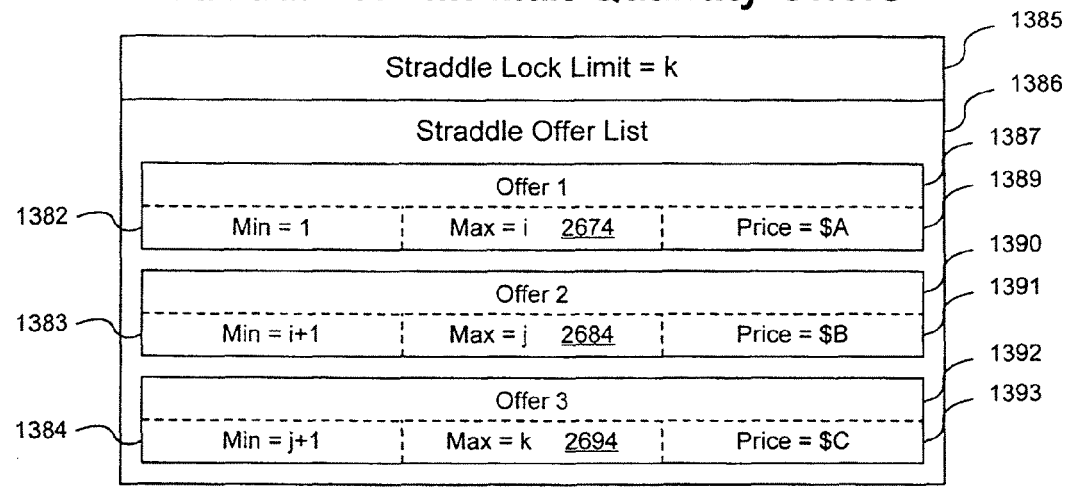
FIG. 13C is a block diagram illustrating the relationship between a price schedule and a corresponding straddle of min-max-quantity offers.

FIG. 13C is a block diagram illustrating the relationship between a price schedule and a corresponding straddle of disadvantaged offers, each with a min-max quantity. The referenced price schedule is price schedule 1330 of FIG. 13B. Pricing schedule 1330 may be represented by a straddle of disadvantaged offers 1380. The straddle contains one offer for each price step (1382, 1383, and 1384) and the straddle lock limit 1385 denotes the maximum aggregate number of units available. The min-max quantity specification of each of the straddled offers denotes the minimum and maximum number of units to which the pricing applies.

Stepped pricing schemes are traditionally monotonically increasing or decreasing as one moves from price step to price step. Increased quantity traditionally corresponds to more favorable prices for the advantaged offeror. However, alternative embodiments of the subject invention can readily accommodate straddles of offers with overlapping price-step quantities and prices that vary non-monotonically with aggregate quantity. Non-monotonically varying stepped-prices will typically produce the most favorable net result for the advantaged offerors, but, certain inherent conflicts in locking offers with minimum quantity specifications may require that the marketplace designer or operator compromise one desirable market trait in favor of another that may, for example, preclude one or more advantaged offerors from achieving the most favorable result available. In general, monotonically-varying price schedules require fewer such compromises.

Locking methods that support offers with minimum quantity=1 can be used to satisfy the following rules: First, any lock price will be compliant with the terms of the disadvantaged offer. Second, once an advantaged offer locks, the offeror is thereafter guaranteed a transaction at a price equal to or better than the first lock price. Third, an advantaged offer will achieve the best price available in the market, relative to its time of posting. Fourth, an advantaged offer will lock on a more favorable disadvantaged offer before any later advantaged offer will be able to lock on that disadvantaged offer. Finally, once locked, an advantaged offer can only relock at monotonically improving prices.

Supporting offers with minimum quantity>1 may create conflicts among these rules. That is, alternative embodiments that support min-max quantity specifications may not be able to simultaneously satisfy all of the above rules, and it becomes an implementation choice for the market operator to determine where to compromise as shown in the discussion of FIG. 23 below.

Figure 14:
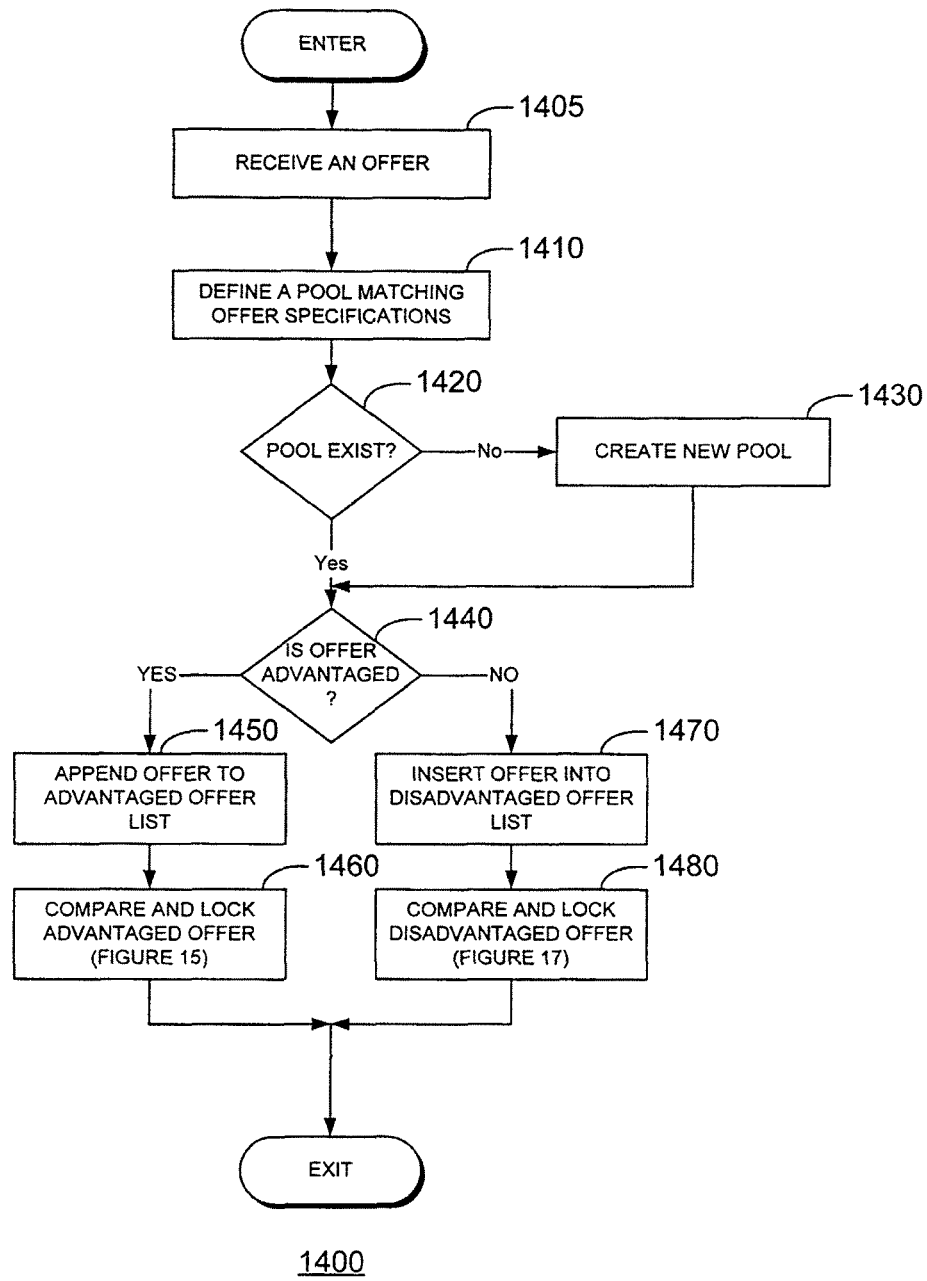
FIG. 14 is a flow diagram of a method consistent with the present invention for posting and locking offers.

FIG. 14 is a flow diagram of a method consistent with the present invention for posting and locking offers. First, the market-clearing mechanism receives an offer (step 11405). Next, a pool definition is created based on the pool and product specifications contained within the received offer (step 1410). Next, it is determined whether such a pool exists (step 1420). If not, a new pool is created (step 1430). If the pool already existed, or after the new pool is created in step 1430, it is determined whether the offer is advantaged or disadvantaged (step 1440).

If the offer is an advantaged offer, it is appended to the advantaged offer list of the relevant pool (step 1450). Next, the offer is compared with the disadvantaged offer list and locked appropriately as further described in FIG. 15. If, however, the offer is a disadvantaged offer, the offer is inserted into the disadvantaged offer list of the relevant pool (step 1470). Next the process of locking the new disadvantaged offer list to the advantaged offer list is performed (step 1480) as further described in FIG. 17.

When a new offer is posted, the post and lock process is responsible for posting an offer to a pool and for locking the offer to any previously posted opposite offer. When later offers are posted, the process of posting and locking those later offers may require that an already-posted offer be re-examined and possibly locked, unlocked, or relocked.

For transactional efficiency, market-clearing engines consistent with the present invention may take advantage of the fact that the advantaged and disadvantaged offer lists are primarily ordered by timestamp and price respectively. Once posted, an advantaged offer need not be again compared to all disadvantaged offers. It need only be compared to disadvantaged offers that are newly posted or newly unlocked and made available for relocking.

Once posted, a disadvantaged offer need not be again compared to all advantaged offers. However, when a disadvantaged offer is unlocked by a better-priced disadvantaged offer, the unlocked disadvantaged offer is compared to all advantaged offers posted after the advantaged offer from which it unlocked. Doing so enables later advantaged offers to achieve a first lock at their reserve price or better or to possibly achieve a better lock price by relocking to the just-unlocked disadvantaged offer. If, in the process of locking to a later advantaged offer, a less-favorably-priced disadvantaged offer is unlocked, the process continues from the point of unlocking on the advantaged offer list until all unlocked disadvantaged offers are relocked or the advantaged offer list is exhausted.

The sequencing and locking process for newly-posted advantaged offers is different from the sequencing and locking process for newly-posted disadvantaged offers. When an advantaged offer is posted, the market-clearing engine calculates the pricing function of each disadvantaged offer. The market-clearing engine uses the attributes of the posted advantaged offer as input to each disadvantaged offer's pricing function. The market-clearing engine then sequences disadvantaged offers using the prices calculated from their pricing functions. The most-favorable price for the posted advantaged offer appears first and the least-favorable price appears last on the sequenced disadvantaged offer list. Those disadvantaged offers with the same price are sub-sequenced from earliest-posted (first) to latest-posted (last). The market-clearing engine then proceeds along the ordered disadvantaged offer list attempting to lock the posted advantaged offer to each disadvantaged offer in sequence until the advantaged offer is fully locked or the disadvantaged offer list is exhausted.

When a disadvantaged offer is posted, the market-clearing engine sequences the advantaged offer list from first posted to last posted. Note that the advantaged offer list can be created in this sequence. Thus a market-clearing mechanism can use the advantaged offer list to form properly-sequenced subsets of the advantaged offer list without performing a separate sorting operation. A market-clearing engine may examine each advantaged offer in sequence. For each advantaged offer, it may evaluate the disadvantaged-offer's pricing function using attributes of the advantaged offer. It then compares the two offers. If these two offers match, meaning they have matching product, price, and quantity, then the market-clearing engine locks the two for the number of units available between them. If the posted disadvantaged offer is fully locked, then the compare and lock process is finished. If the posted disadvantaged offer is not fully locked, then the compare and lock process proceeds until the newly-posted disadvantaged offer is fully locked or the advantaged offer list is exhausted.

Figure 15:
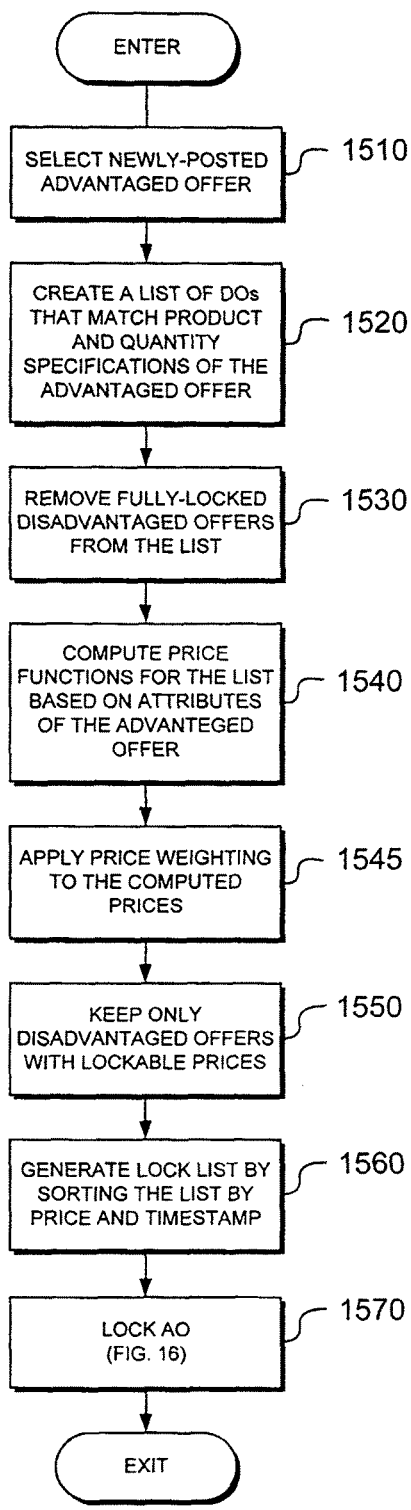
FIG. 15 is a flow diagram for a method consistent with the present invention of generating a lock list for a selected advantaged offer.

FIG. 15 is a flow diagram for a method consistent with the present invention of generating a lock list for a selected advantaged offer. In step 1510, the newly-posted advantaged offer is selected. Next, a list of disadvantaged offers that satisfy the product and quantity specifications of the selected advantaged offer are created (step 1520). Fully-locked disadvantaged offers are removed from the list (step 1530). It is evident to one skilled in the art that previously locked disadvantaged offers could have been excluded at other points in the process. Next the price functions of the disadvantaged offers are computed based on the attributes specified in the selected advantaged offer (step 1540).

Then, if price weighting is associated with the advantaged offer's price specification (step 1545), then the price weighting is applied to the raw price generated by the disadvantaged offer's pricing function to produce a weighted disadvantaged offer price. Reserve and lock prices are unweighted prices. Weighted prices are used to determine the order in which disadvantaged offers are placed for comparing and locking. Weighted prices are not used for actual lock prices or transaction payments. If desired by the advantaged offeror, weighted prices can also be used to test against the current reserve or lock price to determine if an advantaged offer is lockable to a disadvantaged offer. One use of a weighting function is to allow the advantaged offeror to express tradeoffs like: "It is worth $100 more to me if the seller has factory-trained service technicians." A weighting function can adjust the raw price generated by the disadvantaged offer pricing function to take into consideration the extra $100 value the buyer (in this example) perceives in factory-trained service technicians. Price weighting is used to sort disadvantaged offers even though final transactions will occur at the lock price.

Next, disadvantaged offers with price functions that are lockable to the current price of the selected advantaged offer are kept in the list of disadvantaged offers and the rest are discarded (step 1550). Note that this check for conformance uses weighted or unweighted prices depending on the specification in the offer (using, for example, a compare weighted price indicator such as flag 750 in FIG. 7).

Next, a lock list is generated by sorting the remaining disadvantaged offers by weighted price, if applicable, or unweighted price, and timestamp (step 1560). Thus, the lock list is sorted first on price in the order most favorable to the advantaged offer, and disadvantaged offers with the same price are further ordered by timestamp, earliest to latest. Finally, in step 1570, the selected advantaged offer is locked to the most favorable disadvantaged offer, as further described in FIG. 16.

Figure 16:
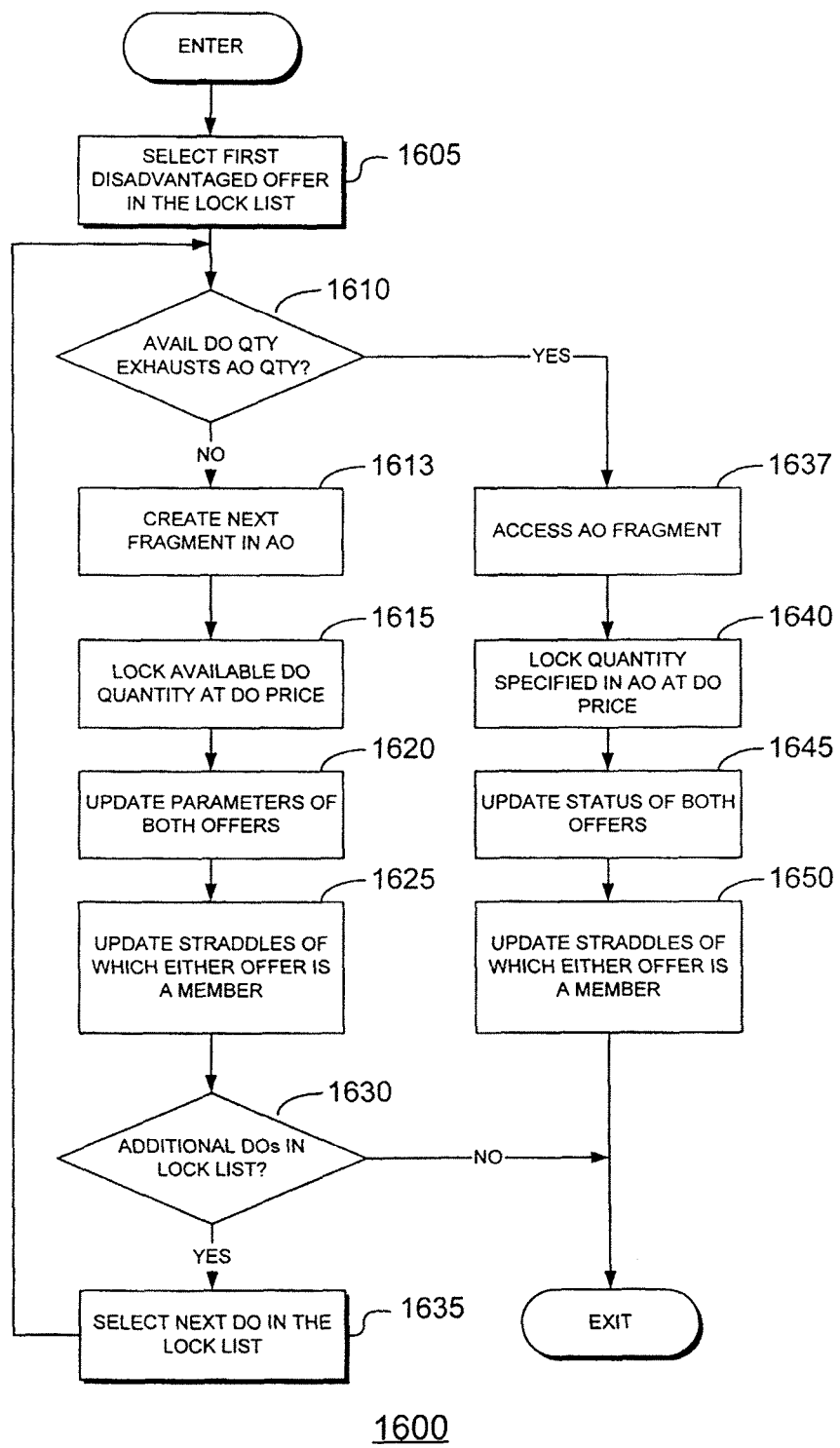
FIG. 16 is a flow diagram of a method consistent with the present invention for locking an advantaged offer.

FIG. 16 is a flow diagram of a method, consistent with the present invention, for locking an advantaged offer. The first step is to select the first disadvantaged offer in the lock list of ordered disadvantaged offers (step 1605). Next, the available quantity of the selected disadvantaged offer is compared to the needed quantity of the advantaged offer to determine whether the disadvantaged quantity specification is adequate to satisfy the quantity specification in the advantaged offer and the quantity specification of any straddle of which the advantaged offer is a member (step 1610). This can be accomplished, for example, by determining whether t disadvantaged offer available quantity is greater than or equal to the advantaged offer available fragment quantity specification. An available fragment may only be present if an unlocked quantity in an offer is available, as is the case in the example offer data structure 322 of FIG. 3. In data structure 322, information about the available quantity is contained in the quantity field of the first fragment of fragment list 332.

If there is sufficient disadvantaged offer quantity, the advantaged offer fragment is accessed (step 1637). Note that this will be the last disadvantaged offer needed to fully lock the advantaged offer. Next, the remaining unlocked advantaged offer quantity (after considering straddle constraints) is locked at the price computed using the disadvantaged offer price function (step 1640). Next, the attributes including the quantity specification are updated in both offers to reflect the new lock (step 1645). This reduces the offered quantities in the quantity specification by the newly locked quantity. Additionally, any straddles are updated in which either offer is a member (step 1650). Updating a straddle, a member offer of which has just locked, may involve withdrawing all of the rest of the offers in a straddle or adjusting the number of units or offers available to lock in the straddle.

Referring back to step 1610, if the available quantity corresponding to the disadvantaged offer is not sufficient to fulfill the quantity requested in the advantaged offer, then the next fragment in the advantaged offer is created (step 1613). In step 1615, the quantity of the disadvantaged offer is locked at the disadvantaged offer price. The available quantity is the lesser of the available quantity in the disadvantaged offer and the available quantity in any straddle of which the offer is a member. Next, the specifications are updated for both offers to reflect the newly locked quantity (step 1620). Any straddles to which either offer belongs are updated appropriately based on the quantity locked (step 1625). Since the advantaged offer has unfulfilled requested quantities, it is determined whether there are additional disadvantaged offers in the lock list (step 1630). If so, the next disadvantaged offer is selected (step 1635), and the process continues. If not, the advantaged offer locking process is complete.

Figure 17:
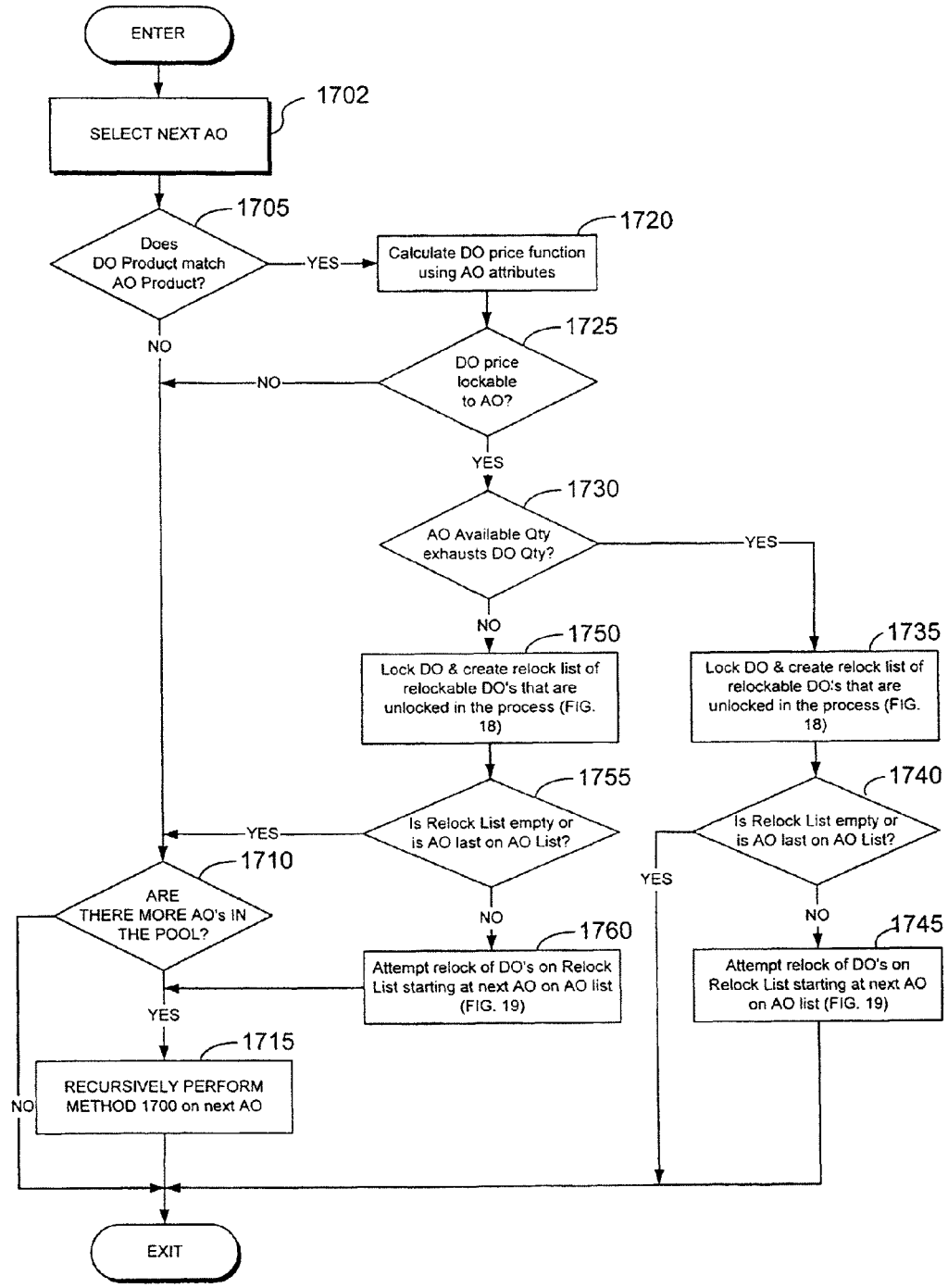
FIG. 17 is a flow diagram of a method consistent with the present invention of comparing and locking a disadvantaged offer.

FIG. 17 is a flow diagram of a method 1700 consistent with the present invention of comparing and locking a disadvantaged offer. It is assumed that before performing the method, the next advantaged offer is set to the first advantaged offer in the list of advantaged offers. The first step is to select the next advantaged offer (step 1702). In step 1705, the method determines whether the disadvantaged offer product specification is compatible with the advantaged offer product specification.

If the product specifications do not match, it is determined whether there are more advantaged offers in the pool (step 1710). If more advantaged offers are in the pool, process 1700 is recursively performed (step 1715). If there are no more advantaged offers in the pool, then the process completes.

If the product specifications do match (step 1705), then the disadvantaged price function is calculated using the attributes of the advantaged offer (step 1720). Next it is determined whether the disadvantaged price is lockable to the advantaged offer (step 1725). A price is lockable if the disadvantaged offer price, whether weighted or unweighted, depending on the setting of a flag such as flag 750 in FIG. 7, is (i) within the advantaged offer reserve price if the fragment is unlocked or (ii) less than the fragment's current lock price if locked.

If the price is not lockable, it cannot lock and the process continues for the next advantaged offer on the list. On the other hand, if the disadvantaged price is lockable, the method will proceed to step 1730. The advantaged offer quantity, which is the sum of all lockable fragments, and the disadvantaged quantity are calculated considering the constraints of any straddles of which the disadvantaged offer or the advantaged offer are members. Step 1730 determines whether the advantaged offer quantity specification is sufficient to exhaust the available quantity associated with the disadvantaged offer. For both the advantaged offer and the disadvantaged offer, available quantity refers to the lesser of the quantity remaining in the offer specification and the current straddle limit of any straddle of which the offer is a member.

If the advantaged offer quantity is sufficient to exhaust the disadvantaged offer quantity, the process of locking a disadvantaged offer is performed (step 1735) and quantity to lock is the quantity available in the disadvantaged offer. The process in step 1735 is further explained in conjunction with FIG. 18. While performing the process (step 1735), the market-clearing engine may unlock disadvantaged offers with less favorable prices. Note that the subject disadvantaged offer may offer enough quantity at a sufficiently favorable price to unlock more than one fragment. As each fragment may represent a different disadvantaged offer, more than one offer may be unlocked. Unlocked disadvantaged offers are placed on a relock list.

In the next step it is determined whether the relock list is empty (step 1755). If the relock list is empty, the process terminated, otherwise, as further described in FIG. 19, the market-clearing engine attempts to relock the disadvantaged offers on the relock list (step 1745).

If the advantaged offer quantity is not sufficient to exhaust the quantity available in the disadvantaged offer (step 1730), the process of locking a disadvantaged offer is performed and the quantity to lock is the quantity available in the advantaged offer (step 1750). This process is further explained in conjunction with FIG. 18. Next it is determined whether the relock list is empty (step 1755). If it is empty, the process proceeds to step 1710. Otherwise, the disadvantaged offer is re-locked as further described in FIG. 19 (step 1760). Finally, method 1700 is recursively performed (step 1715) until the process terminates.

Figure 18:
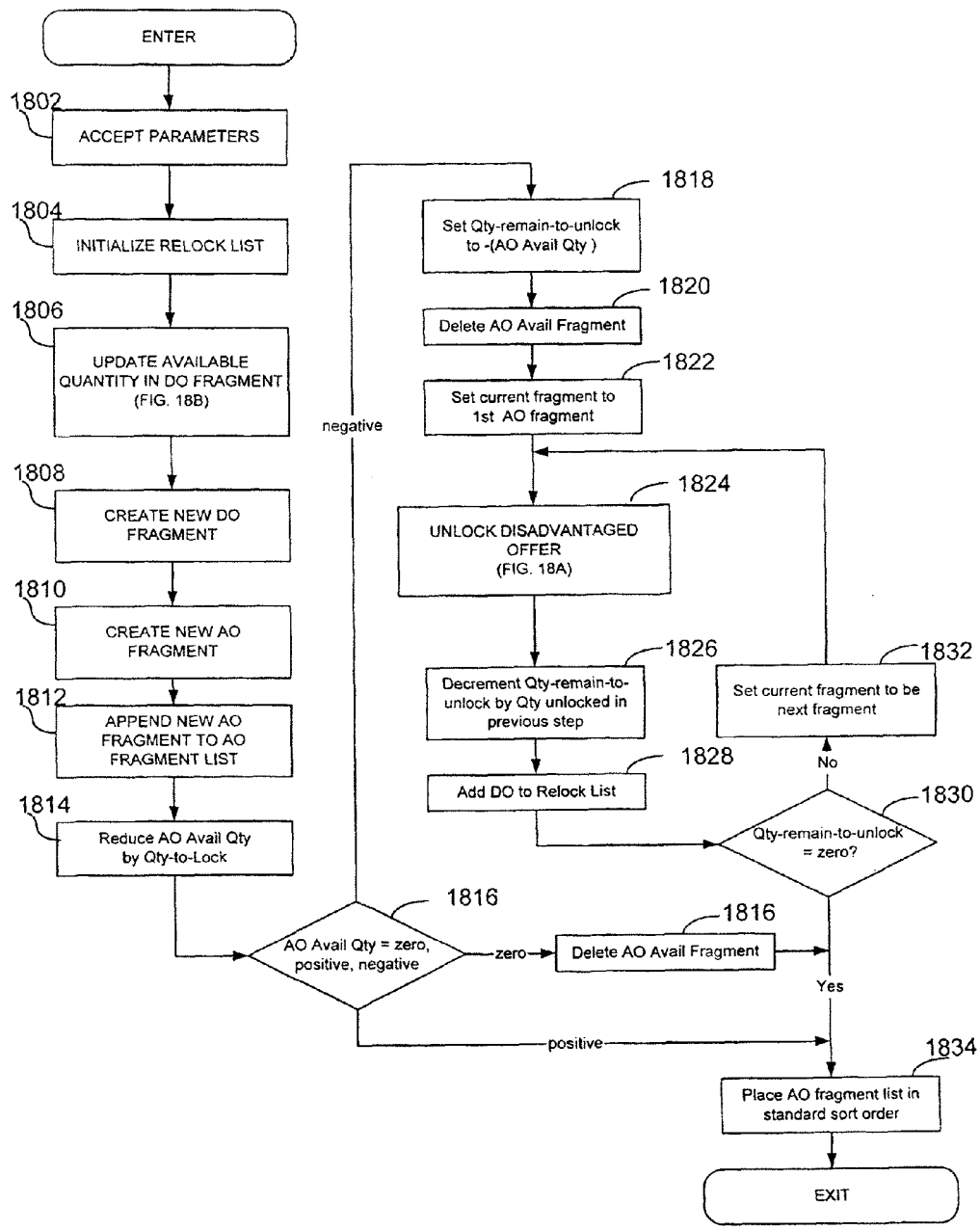
FIG. 18 is a flow diagram for a method consistent with the present invention of locking a disadvantaged offer.

FIG. 18 is a flow diagram for a method of locking a disadvantaged offer. First, necessary parameters are accepted (step 1802). Next, the relock list is initialized (step 1804). Next, the available quantity in the disadvantaged offer fragment is updated as further described in conjunction with FIG. 18B (step 1806). Next, a new disadvantaged offer fragment is created (step 1808), and a new advantaged offer fragment is created (step 1810). Next, the new advantaged offer fragment is appended to the advantaged offer fragment list (step 1812). Next, the advantaged offer available quantity is reduced by an amount equal to the quantity to lock (step 1814). Next, if the advantaged offer available quantity is zero, then disadvantaged offer has locked exactly the quantity of available units in the advantaged offer, no disadvantaged offers are unlocked and the empty available fragment may be deleted. The advantaged offer available fragment is deleted (step 1816), and where the advantaged offer fragment list is placed in standard sort order (step 1843), and the process then terminates.

If the advantaged offer available quantity is positive (step 1816), then the advantaged offer will still have available quantity after locking to the disadvantaged offer, no disadvantaged offers will be unlocked, and the advantaged offer fragment list is placed in standard sort order (step 1843), and the process then terminates.

If the advantaged offer available quantity is negative (step 1816), then the disadvantaged offer will fully lock the available quantity of the advantaged offer, will lock to other previously locked fragments of the disadvantaged offer, and will unlock those previously locked offers associated with the fragments to which the disadvantaged offer locks. The process proceeds by setting the quantity remaining to unlock to the additive inverse of the advantaged offer available quantity (step 1818). Next the advantaged offer available fragment is deleted (step 1820), as there is no longer available unlocked quantity in the advantaged offer. Next, the current fragment is set to the first advantaged offer fragment (step 1822). In this example, the offer fragment list is maintained in standard sort order, from worst lock-price to best lock-price. Next, the disadvantaged offer associated with the current fragment is unlocked as further described in conjunction with FIG. 18A (step 1824). Next, the quantity remaining to unlock is decremented by the quantity unlocked in the previous step (step 1826). Next, the unlocked disadvantaged offer is appended to the relock list (step 1828) provided that it is relockable. Next, it is determined whether the quantity remaining to unlock is zero. If not, the current fragment is set to the next fragment on the fragment list (step 1832). If the quantity remaining to unlock is zero then the advantaged offer list is placed in standard sort order (step 1834) and the process terminates.

Figure 18A:
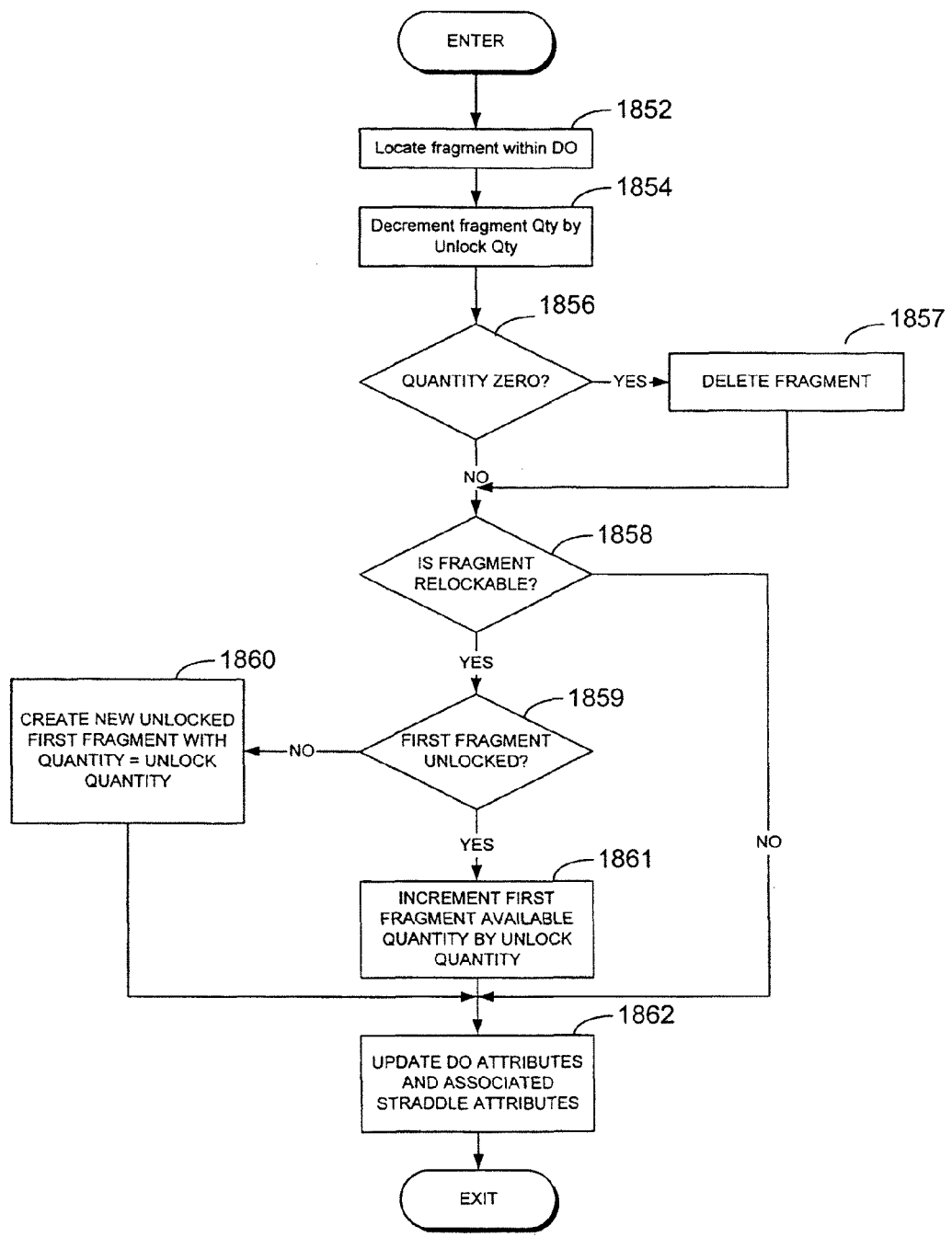
FIG. 18A is a flow diagram for a method consistent with the present invention of unlocking a disadvantaged offer.

FIG. 18A is a flow diagram for a method consistent with the present invention of unlocking a disadvantaged offer. The fragment to be unlocked is located within the disadvantaged offer (step 1852). Next the fragment quantity is decremented by the quantity being unlocked (step 1854). If the resulting fragment quantity is zero (step 1856), the fragment is deleted (step 1857). If the fragment lock status is relockable (step 1858), then it is determined whether the first fragment is unlocked (step 1859). If it is, then the first fragment available quantity is incremented by unlock quantity (step 1861). Next, the disadvantaged offer attributes and straddle attributes are updated, including status, quantities, and flags (step 1862).

If the fragment is not relockable (step 1858), then execution resumes at step 1862. If the first fragment is not unlocked (step 1859), then a new unlocked first fragment is created with quantity equal to the unlock quantity (step 1860). Finally, the disadvantaged offer status and other attribute are updated (step 1862), and the process is complete.

Figure 18B:
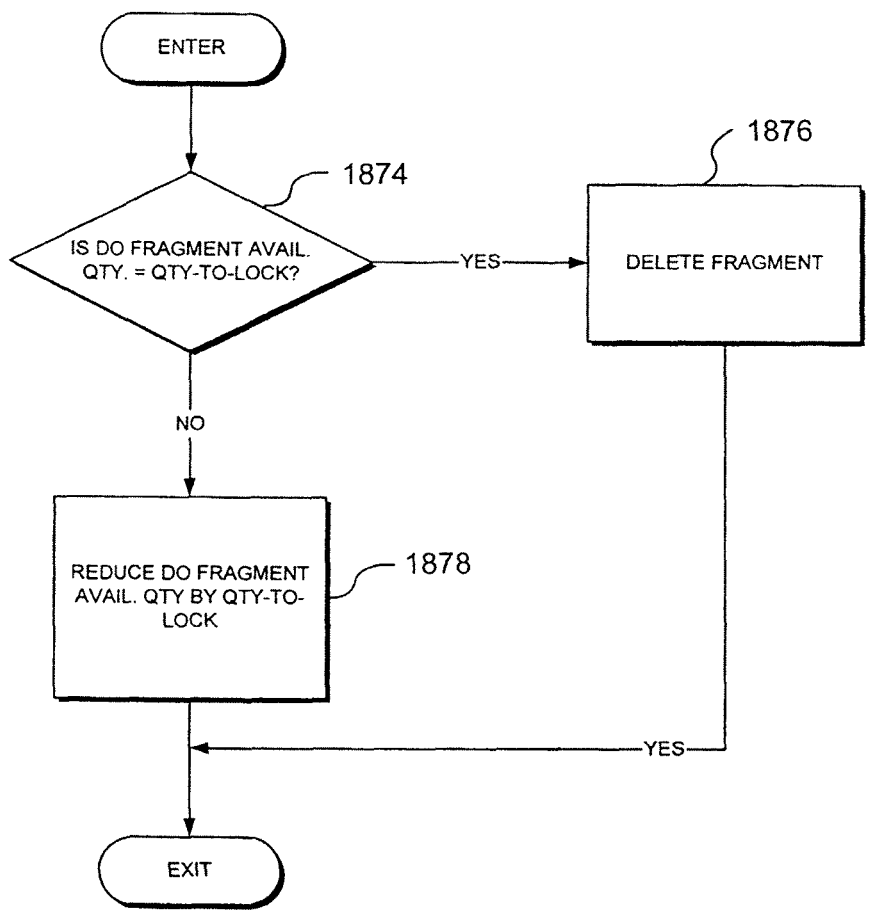
FIG. 18B is a flow diagram for a method consistent with the present invention of updating the available quantity in a disadvantaged offer fragment.

FIG. 18B is a flow diagram for a method consistent with the present invention of updating the available quantity in a disadvantaged offer fragment. If the disadvantaged offer fragment available quantity is equal to the quantity to lock (step 1874), the fragment is deleted (step 1876). Otherwise, the fragment available quantity is reduced by the quantity to lock (step 1878).

Figure 19:
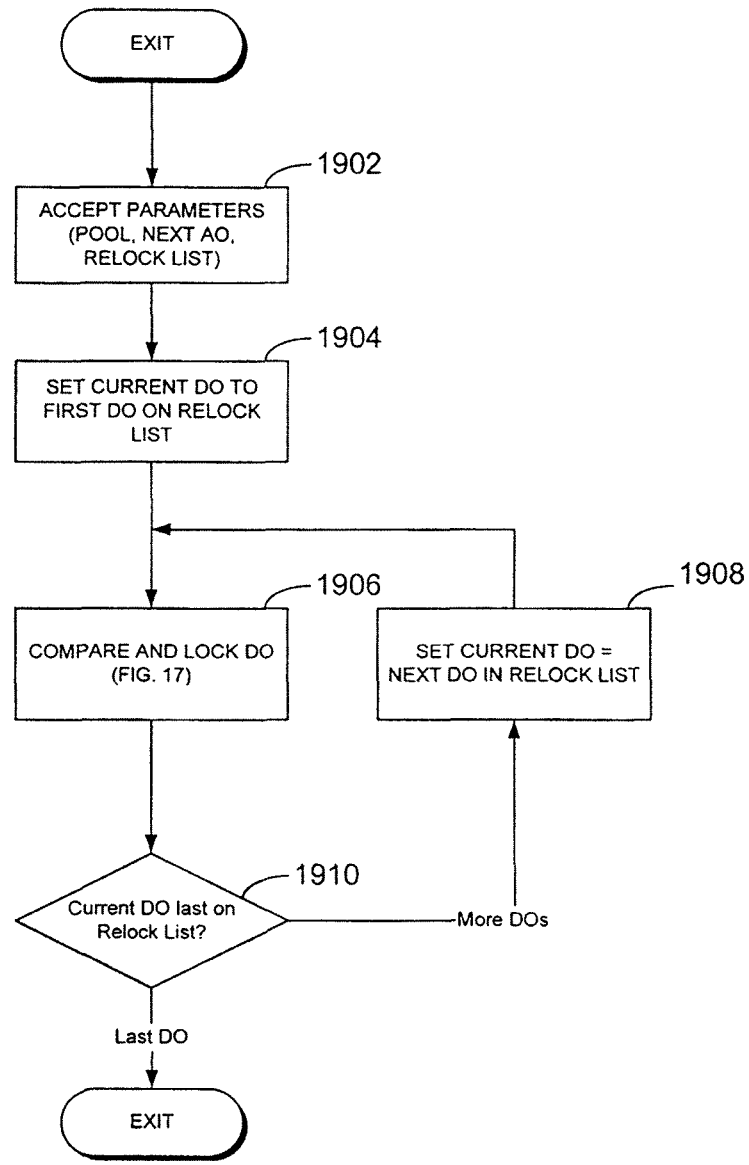
FIG. 19 is a flow diagram for a method consistent with the present invention of relocking a disadvantaged offer.

FIG. 19 is a flow diagram for a method consistent with the present invention of relocking a disadvantaged offer. First, parameters are accepted including a pool identifier, the next advantaged offer on the advantaged offer list of the identified pool, and a relock list (step 1902). Next, the current disadvantaged offer is set to the first disadvantaged offer on the relock list (step 1904). Next, the method compares and locks the disadvantaged offer as further described in conjunction with FIG. 17 (step 1906). If the current disadvantaged offer is not the last on the relock list (step 1910), then the current disadvantaged offer is set to the next disadvantaged offer in the relock list (step 1908), and the process continues at step 1906. If the current disadvantaged offer is the last one on the relock list (step 1910), then the process is complete.

Figure 20:
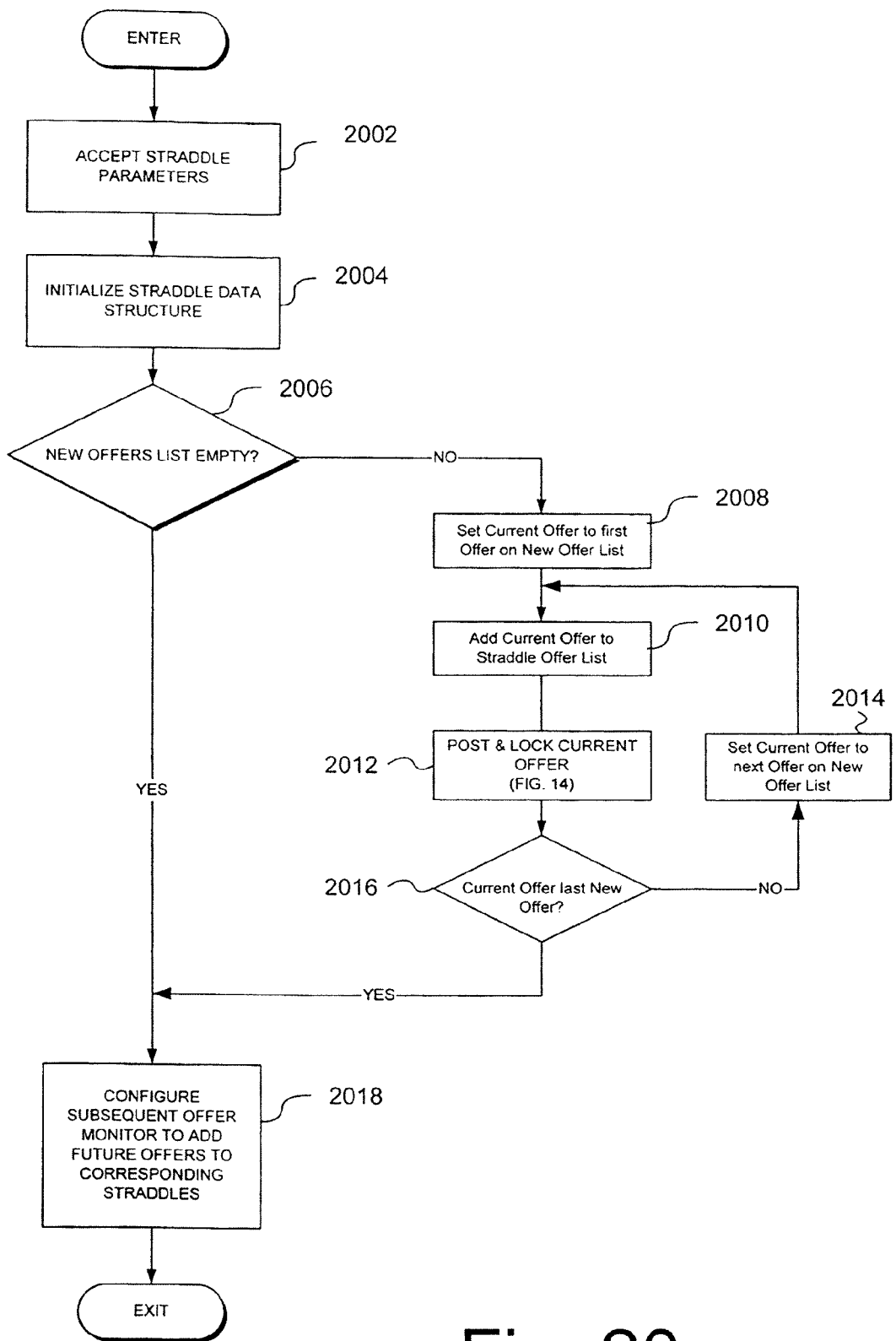
FIG. 20 is a flow diagram for a method consistent with the present invention of posting a straddle.

FIG. 20 is a flow diagram for a method of posting a straddle consistent with the present invention. Straddle parameters are accepted (step 2002). Next, the straddle data structure is initialized, including adding a list of previously-posted offers to the straddle offer list (step 2004). If the new offers list is empty (step 2006), then a subsequent offer monitor is configured to add future offers to the straddle (step 2018), and the process is complete. One example of a subsequent offer monitor can be an offeror who could simply direct the marketplace interface to add an offer to an existing straddle.

If the new offers list is not empty (step 2006), then the current offer is set to the first offer on the new offer list (step 2008). Next, the current offer is added to the straddle offer list (step 2010). The straddle offer list contains the list of all offers that are currently members of the straddle. Hence the posting of a straddle requires that two categories of offers be place on the straddle offer list: (i) all straddled offers that have already been posted prior to the posting of the straddle and (ii) all new offers on the new offer list (those offers to be posted concurrently with the posting of the straddle). Future offers that are to be members of the straddle and that are posted after the straddle itself has been posted will also be added to the straddle offer list when they are posted.

Next, the method posts and locks the current offer, as further described in conjunction with FIG. 14 (step 2012). If the current offer is not the last new offer on the new offer list (step 2016), then set the current offer to the next offer on the new offer list (step 2014). Otherwise, the method continues at step 2018.

Figure 21:
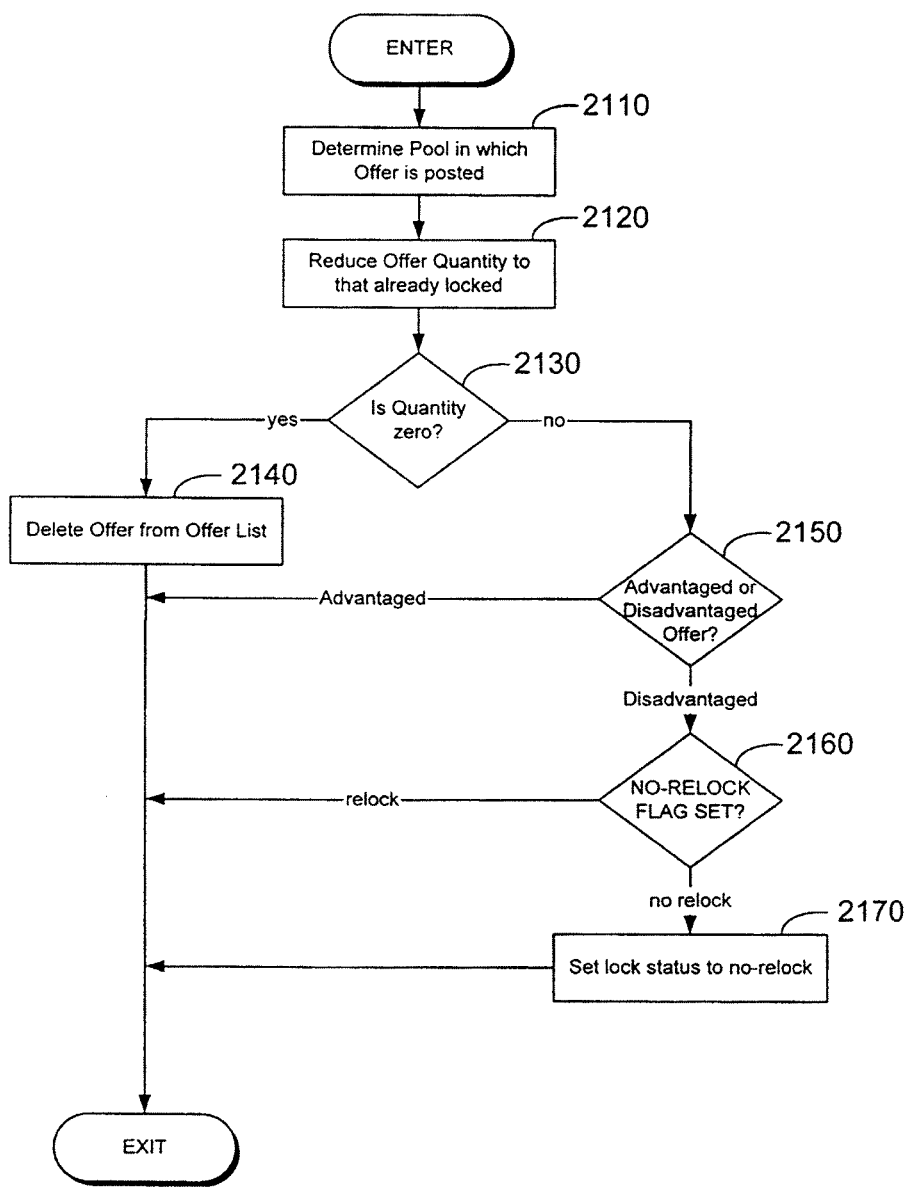
FIG. 21 is a flow diagram for a method consistent with the present invention of posting a withdrawal.

FIG. 21 is a flow diagram for a method consistent with the present invention of posting a withdrawal. To post a withdrawal in a market-clearing system consistent with the present invention, the first step is to determine in which pool the offer is posted (step 2110). Next, the quantity of the withdrawn offer is reduced to the quantity that is currently locked (step 2120). If the resulting quantity is zero (step 2130), then the offer is deleted from the offer list (step 2140). If not (step 2130), then in it is determined whether the offer is an advantaged offer or a disadvantaged offer (step 2150). If the withdrawn advantaged offer has a non-zero locked quantity, then the advantaged offer cannot be fully withdrawn and the process ends. If the offer is a disadvantaged offer then it must be determined whether the offer has the no-relock attribute (step 2160). If the offer does not have the no-relock attribute, then it may relock. Otherwise, the do not relock flag is in the set state, and the lock status is placed into the set state (step 2170).

Whereas unlocked offers can be withdrawn at any time, locked offers cannot be withdrawn as long as the offer is locked. An offeror can modify an offer at any time to reduce the offered quantity to the quantity currently locked. An offeror may not otherwise modify a posted offer.

Figure 22:
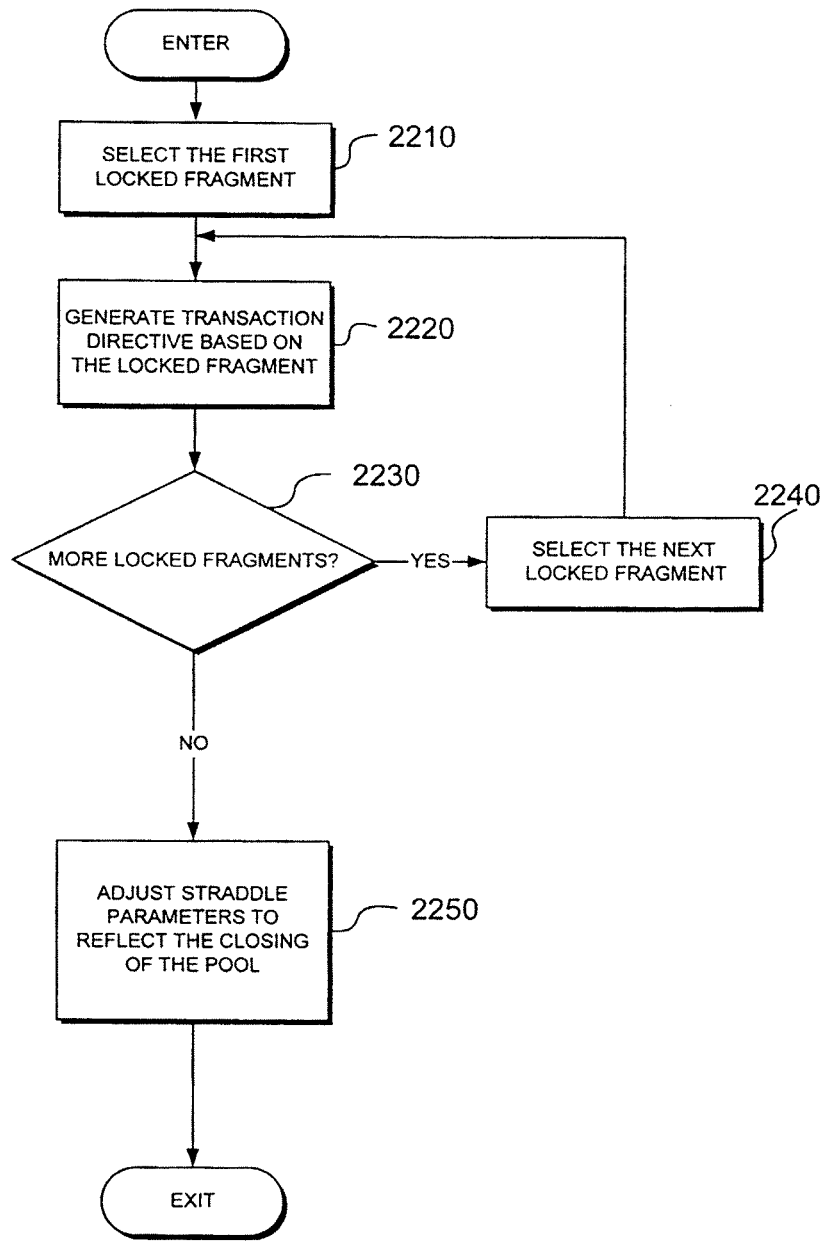
FIG. 22 is a flow diagram for a method consistent with the present invention of closing a pool.

FIG. 22 is a flow diagram for a method consistent with the present invention of closing a pool. The first step is to select the first locked fragment corresponding to the first locked pair of offers in the pool (step 2210). Next a transaction directive is generated based on the locked fragment (step 2220). A transaction directive is simply some kind of a report or output to the transacting parties confirming their obligation to complete the transaction. If there are more fragments (step 2230), then the next locked fragment is selected (step 2240) and the process continues at step 2220. If not (step 2230), then straddle parameters are adjusted to reflect the offers that were removed due to the closing of the pool (step 2250). Since there may be straddles that contain offers in other pools, the closing of one pool does not necessarily imply the closing of all straddles that reference that pool. Straddles are updated by removing offers in the closing pool, adjusting lock limits by locked quantities in the closing pool, and adjusting other relevant straddle status items.

At the close of a pool, locked offers result in transactions. Unlocked offers do not produce a transaction. For example, consider a buyer who specifies a $10,000 reserve price for a welding machine in a buyer-advantaged market. If the lowest offered selling price at close is $10,800, the buy offer with its $10,000 reserve price will never lock, no transaction directive involving this buy offer will be generated, and the buyer will not make a purchase in this pool.

Referring back to FIG. 1, as part of the pool closing process, market-clearing engine 185 causes transaction directives 176 to be transmitted to the transaction database 181. These transaction directives are then compiled into transaction reports 170 and 172 that are delivered to transacting buyers and sellers to facilitate completion of the transactions. One embodiment produces transaction directives that cause transactions between each locked pair of offers. Other embodiments may not map fragments directly to transaction directives between the two offerors of each fragment. For example, buyers A and B may have specified identical offers resulting in A locking to seller X and B locking to seller Y and all parties doing so at the same final lock price. A transaction directive that maps directly to locked fragments at the close of this pool will result in a directive for A and X to transact and for B and Y to transact. A transaction alternative consistent with the invention could direct A and Y to transact and B and X to transact. The specific transactions may use other than a one-to-one mapping between fragments and transactions provided that the offer specifications and lock price produce a comparable match for the ultimately transacting parties.

FIG. 23 is a block diagram illustrating a potential conflict inherent in the use of min-max-quantity offers. The representative pool is buyer-advantaged. Disadvantaged sell offer 2310 is posted first with a min-max-quantity specification that requires that at least two units are able to lock before any units may be locked. Advantaged buy offer 2320 is posted second, but no lock occurs as offer 2320 alone cannot meet the min-max-quantity specification of sell offer 2310. Advantaged buy offer 2330 is posted third. Offers 2320 and 2330 together satisfy the min-max-quantity specification of offer 2310 and both lock to offer 2310. Disadvantaged sell offer 2340 is posted fourth and offers one unit at a better price than offer 2320. The marketplace designer or operator now must make a choice of how to handle this situation. There are several possible approaches. The first approach involves unlocking offer 2310 from offer 2320 and relocking offer 2320 to offer 2340, leaving offer 2330 locked to 2310, which corresponds to the approach shown in FIG. 23, status after 4th posting. The problem is that sell offer 2330 is then locked at a price that was only intended to be offered for the sale of two or more units. If offer 2330 remains locked when the pool closes, then the quantity specification of offer 2310 is violated.

The second approach is to unlock offer 2320 from offer 2310, relock offer 2320 to offer 2340, and unlock offer 2330 from offer 2310. But that would mean that locked advantaged offers may subsequently unlock and not transact during this pool, thus providing no assurance that once locked an advantaged offer will always be locked and ultimately result in a transaction.

The third approach is to continue to lock offer 2320 to offer 2310 to preserve the quantity price of offer 2330. Offer 2320 will only unlock if offer 2330 also unlocks and both can be relocked at prices no less favorable than the quantity lock price they each enjoyed with offer 2310. But that would mean that offer 2320 could not take advantage of better offers because of the presence of offer 2330, thus denying offer 2320 the opportunity to lock at the best price available to it in the marketplace.

The fourth approach is to introduce tentative locks. If a disadvantaged offer's minimum quantity exceeds one, it can only tentatively lock to an advantaged offer. Tentative locks can unlock if the right combination of disadvantaged offers is posted. Disadvantaged offers with minimum quantities equal to one can have both firm and tentative locks. At the close of the pool, the most favorably priced (to the advantaged offeror), tentative locks produce transactions at the tentative lock price and the pool close process updates straddles accordingly. But tentative locking means that advantaged offers may have uncertain interim prices that subsequent disadvantaged offers may cause to be rescinded prior to closing a pool. Thus lock prices may vary non-monotonically from tentative lock to tentative lock rather than varying monotonically.

Different embodiments consistent with the present invention that follow the fourth approach may choose to allow or disallow tentatively-locked offers to be withdrawn. Also, in certain circumstances, an offer with a minimum quantity equal to one may be firmly locked on one opposite offer and tentatively locked on another. Finally, when both advantaged and disadvantaged offerors use monotonically-varying quantity-driven price schedules, minimum quantity specifications are needed only for disadvantaged offers. In this situation, one can simulate tentative locks in a straightforward, but computationally inefficient manner. The results of a tentative locking protocol will be the same, at any stage of offering, as if all locks are removed, then all disadvantaged offers are posted in their original order (producing no locks as there are not yet any opposite offers to which they can lock), then all advantaged offers are posted and locked in their original order. Repeating this process at each posting of an advantaged or disadvantaged offer will produce a series of lock prices for any individual offer that would be the same as if one introduced tentative locks. Tentative locks keep track of sufficient marketplace state to more efficiently (in terms of computation) determine and produce the sequence of lock prices by incrementally adjusting the state of the marketplace rather than by reinitializing the pool and then reposting all disadvantaged offers followed by all advantaged offers. Locking offers with minimum quantity specifications requires augmentation of the exemplary methods described earlier for posting, comparing, and locking offers (FIG. 14 and later).

FIG. 24 is a block diagram illustrating an alternative embodiment of an offer including a minimum and maximum quantity specification. The offer data structure 2410 illustrates an exemplary offer data structure that contains information for tracking lock status and progress towards achieving minimum quantities. Data structure 2410 varies somewhat from data structure 322 in FIG. 3, in that various identifiers are grouped in a data sub-structure 2420, which represents identifiers. Quantity-related information is grouped in a data substructure 2440 and includes a minimum-quantity specification 2442 and a maximum-quantity specification 2444. The available-to-lock-field 2446 is kept constantly updated as to how many units of the maximum allowed in this offer remain unlocked (including straddle-imposed limitations). The currently-locked field 2448 is kept constantly updated as to how many units of this offer are presently locked.

In the fragment list 2450, offer or fragment ID's 2452 may be used to point to a specific offer or to a specific fragment within an offer. An alternative embodiment uses a direct pointer to a fragment. Others may use a direct pointer to an offer and then search for the desired fragment within that offer. Lock status 2454 has at least four states. The first is unlocked. The second is locked, meaning if subsequently unlocked, then attempt to relock on another offer. The third is do-not-relock, meaning locked but do not attempt a relock if unlocked. The fourth is potential-lock, meaning unlocked but could lock if a minimum quantity is achieved.

A lock price 2456 is a reserve price if the lock status is "unlocked" and a lock price otherwise. Fragment quantity 2458 specifies the number of units of the offer represented by this fragment.

In the discussion of the following alternative embodiments, the fragment list of advantaged offers is kept sorted from worst price first to best price, although in other embodiments, the fragment list may be sorted differently or sorted only whenever there is a need to process the fragment list.

Exemplary Min-Max-Quantity Embodiment

Corresponding to each locked, do-not-relock, and potential-lock fragment is an opposite offer fragment with the same quantity. In order to implement minimum-quantity locking, one must first provide a method for recognizing when a minimum quantity constraint can be met by combining the quantities of more than one other opposite offer. Once one can recognize that a minimum quantity is available, then any of a variety of methods can be used to implement a locking policy for dealing with the problem of a later and more-favorably-priced disadvantaged offer locking some units and in the process unlocking enough units from a less-favorably-priced disadvantaged offer to fall below the less-favorably-priced disadvantaged offer's minimum quantity specification while still leaving some units locked at the quantity price, thus violating the pricing specification. Approaches one through four discussed above are examples of locking policies that could be applied when this problem arises.

Mechanisms consistent with the present invention and sufficient to recognize minimum-quantity locking opportunities keep track of potential locks (become real locks when a minimum aggregate quantity is achieved) and provide definitive notice when a locking opportunity is present. One means of doing so is to maintain, for each offer, information about potential locks on opposite offers.

For each advantaged offer, a list of every disadvantaged offer that would match the specifications of the advantaged offer if a minimum quantity were to be achieved is maintained. Each such offer has a potential lock. It is not necessary to track disadvantaged offers that could not lock because they have prices worse than those already available to the advantaged offer. Every time an advantaged offer relocks on a better price or has an initial lock, all potential locks are updated so that their information is current. Thus one removes potential locks with lock prices that are no longer competitive, and one updates quantities available to lock that are associated with each remaining potential lock by accounting for the number of units just locked and their lock price.

When a lock supersedes a potential lock and causes the potential lock to be partially or wholly removed from the present advantaged offer's list of potential locks, the superseded potential lock can then be made available to later-posted advantaged offers to determine the opportunity of a superseded disadvantaged offer to now potentially lock with those later advantaged offers. One way to implement the passing of the superseded potential lock disadvantaged offer to later-posted advantaged offers is to use a process for potential locks similar to the relock process shown in FIG. 19.

Similarly to the advantaged offer case, for each disadvantaged offer, one maintains corresponding lists of potentially lockable advantaged offers. Thus as lock status changes, one can immediately find every relevant disadvantaged and advantaged offer that has the potential to be effected by the change in lock status, adjust the fragments of each such offer to recognize the new status, update potentially available quantities, and pass opportunities to other offers that are created when one offer supersedes another.

Data structure 2410 in FIG. 24 is an example of a data structure that is capable of maintaining such lists. Within data structure 2410, the list of relevant opposite offers is maintained within the fragment list. Summing the appropriate fragments provides an up-to-date account of how close the offer is to achieving its own minimum quantity or the minimum quantity of an opposite offer. Thus when one offer is compared with another offer, a market-clearing engine can immediately determine if the two together will meet or exceed a minimum quantity that renders them lockable. If so, they are locked with an appropriate lock status. If not, each offer's data structure is updated to recognize the additional advance towards achieving a minimum quantity that the opposite offer creates. These checks can occur at every examination of an offer as well as at every change of status of an offer that is represented on a fragment list. A change in one offer can ripple through the lists of offers causing some offers to no longer be available for locking and others to become available for locking.

For example, consider a new offer that fails to meet minimum quantity requirements for a lock. The tracking of minimum-quantity status is facilitated by adding a fragment to the fragment list with status "potential-lock," and placing the fragment in the fragment list in the order of its price. A new potential-lock fragment does not change the available-to-lock or currently-locked fields of the offer's data structure. These fields can only be changed by the occurrence of a lock or unlock event.

Figure 25:
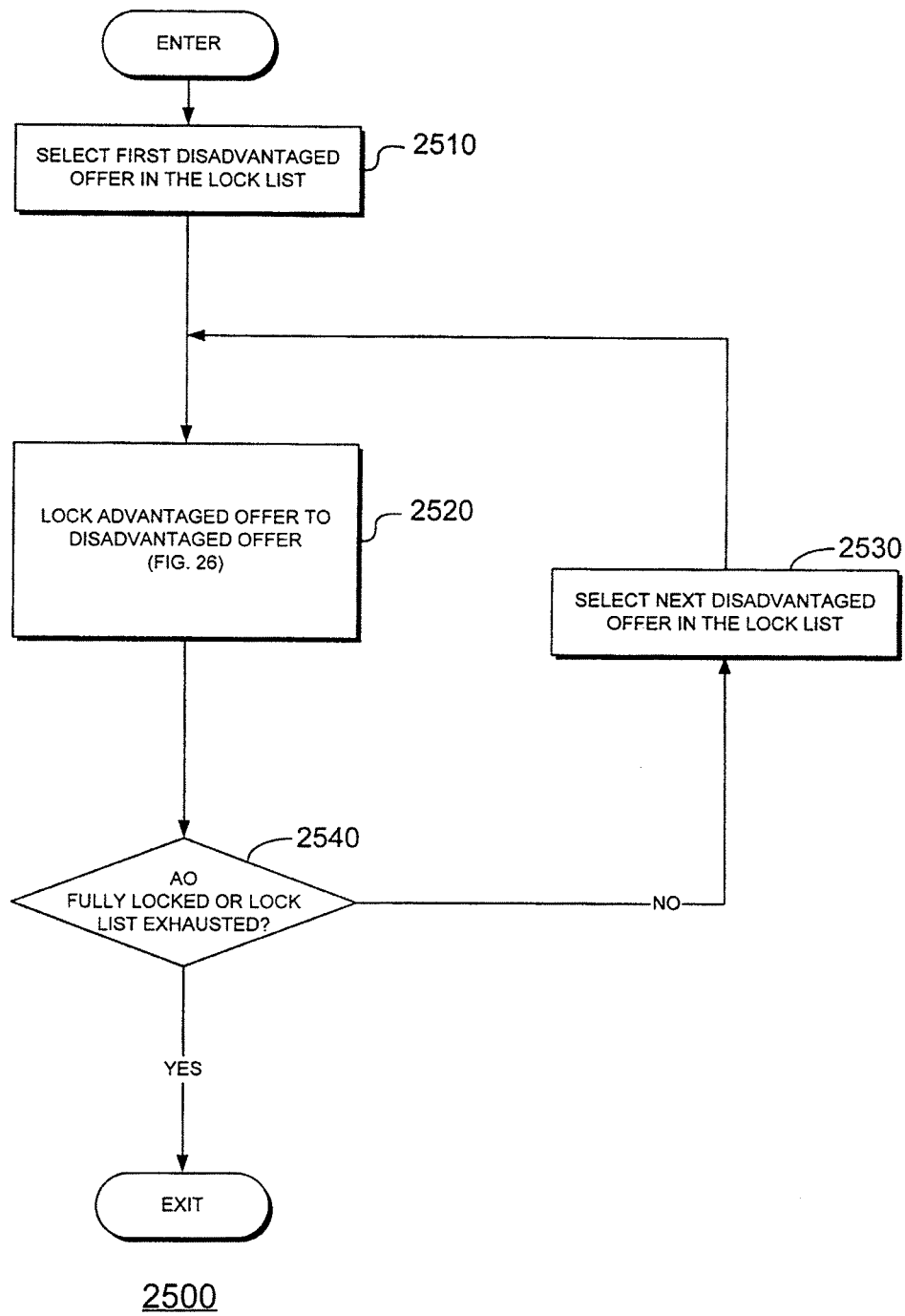
FIG. 25 is a flow diagram of an alternative embodiment consistent with the present invention of a method of locking an advantaged offer.

FIG. 25 is a flow diagram of an alternative embodiment of a method of locking an advantaged offer consistent with the present invention. In order to implement minimum quantity offers, the method must consider the new potential-lock status and check the data fields that contain information needed to determine whether or not the advantaged offer is fully locked and whether or not the lock list has been exhausted. Process 2500 is a minimum-quantity-capable variation of step 1570 in process 1500 to lock an advantaged offer.

First, the first disadvantaged offer in the lock list is selected (step 2510). Next, the advantaged offer is locked to the disadvantaged offer as further described in conjunction with FIG. 26 (step 2520). If the advantaged offer is fully locked or the lock list is exhausted (step 2540), then the process is complete. Otherwise, the next disadvantaged offer in the lock list is selected (step 2530), and the process continues at step 2520.

Figure 26:
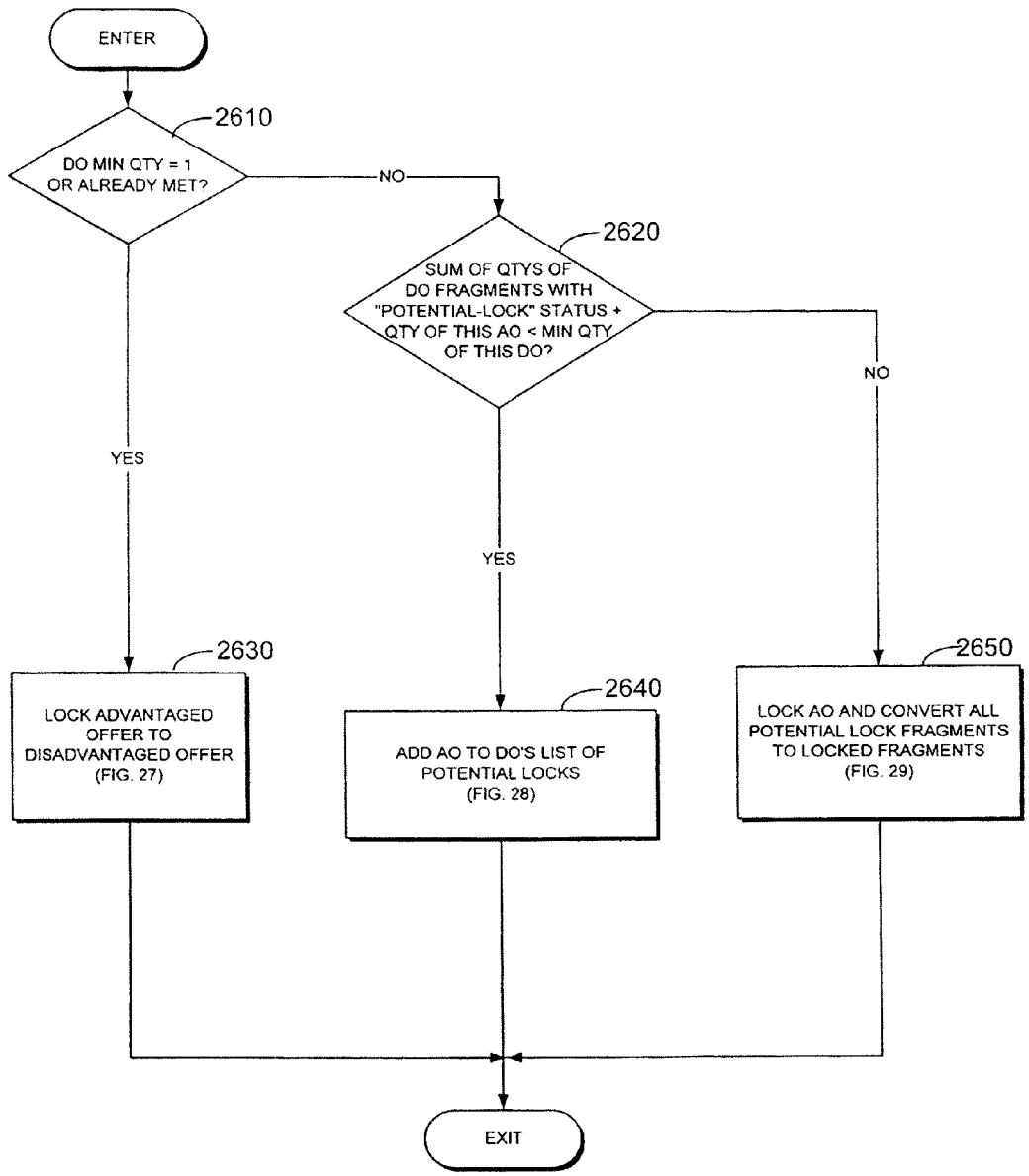
FIG. 26 is a flow diagram of a method consistent with the present invention of locking an advantaged offer to a disadvantaged offer, including the use of potential locks.

FIG. 26 is a flow diagram of a method consistent with the present invention of locking an advantaged offer to a disadvantaged offer, including the use of potential locks. If the disadvantaged offer has a minimum quantity of 1 or has a minimum quantity that is already satisfied (step 2610), the advantaged offer is locked to the disadvantaged offer as further described in connection with FIG. 27 (step 2630).

If the disadvantaged quantity is greater than one and the minimum quantity is not already met (step 2610), then it is determined whether the sum of all potential locks in the fragment list of the disadvantaged offer plus the quantity of the advantaged offer are less than the minimum quantity specification (step 2620). If so, then the advantaged offer is added to the disadvantaged offer's list of potential locks as further described in conjunction with FIG. 28 (step 2640). If not, then the advantaged offer is locked and all potential lock fragments are converted to locked fragments as further described in conjunction with FIG. 29.

Figure 27:
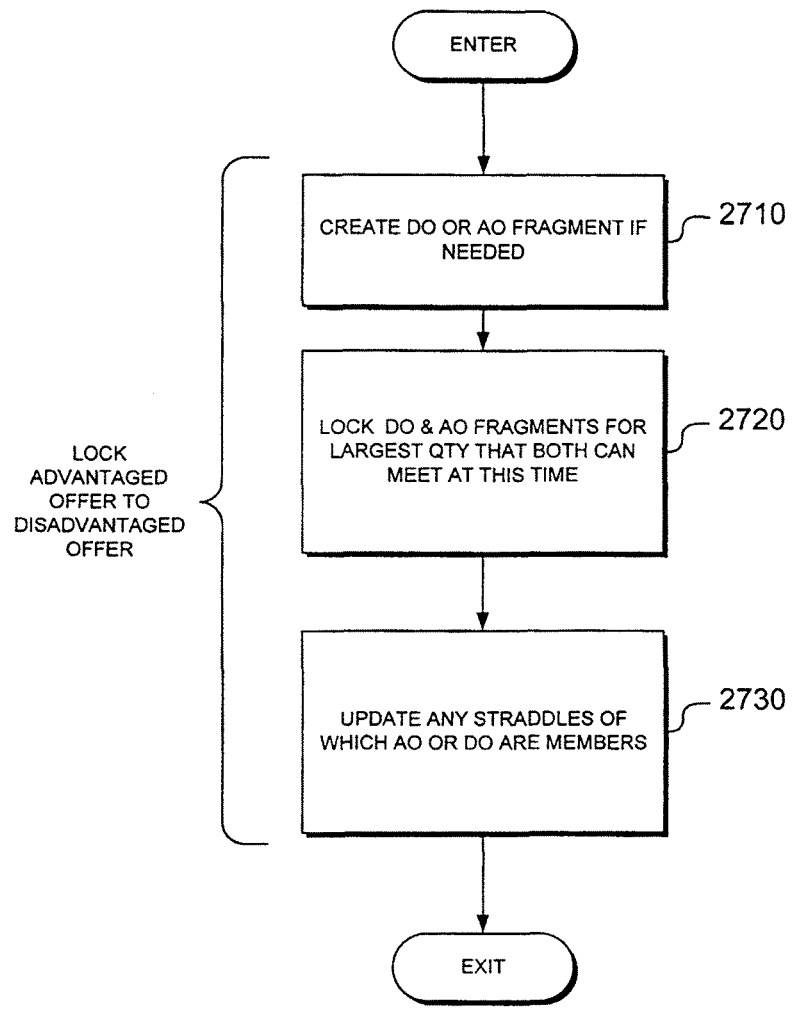
FIG. 27 is a flow diagram of a method consistent with the present invention of locking an advantaged offer to a disadvantaged offer.

FIG. 27 is a flow diagram of a method consistent with the present invention of locking an advantaged offer to a disadvantaged offer. The system creates a disadvantaged offer fragment or an advantaged offer fragment if necessary (step

2710). Next, disadvantaged offer and advantaged offer fragments are locked for the largest quantity that both can currently meet, and appropriate lock status, opposite offer ID, and quantity are set (step 2720). Next, any straddles containing the advantaged offer or the disadvantaged offer are updated by setting available quantity, locked quantity, and the active/inactive flag (step 2730).

Figure 28:
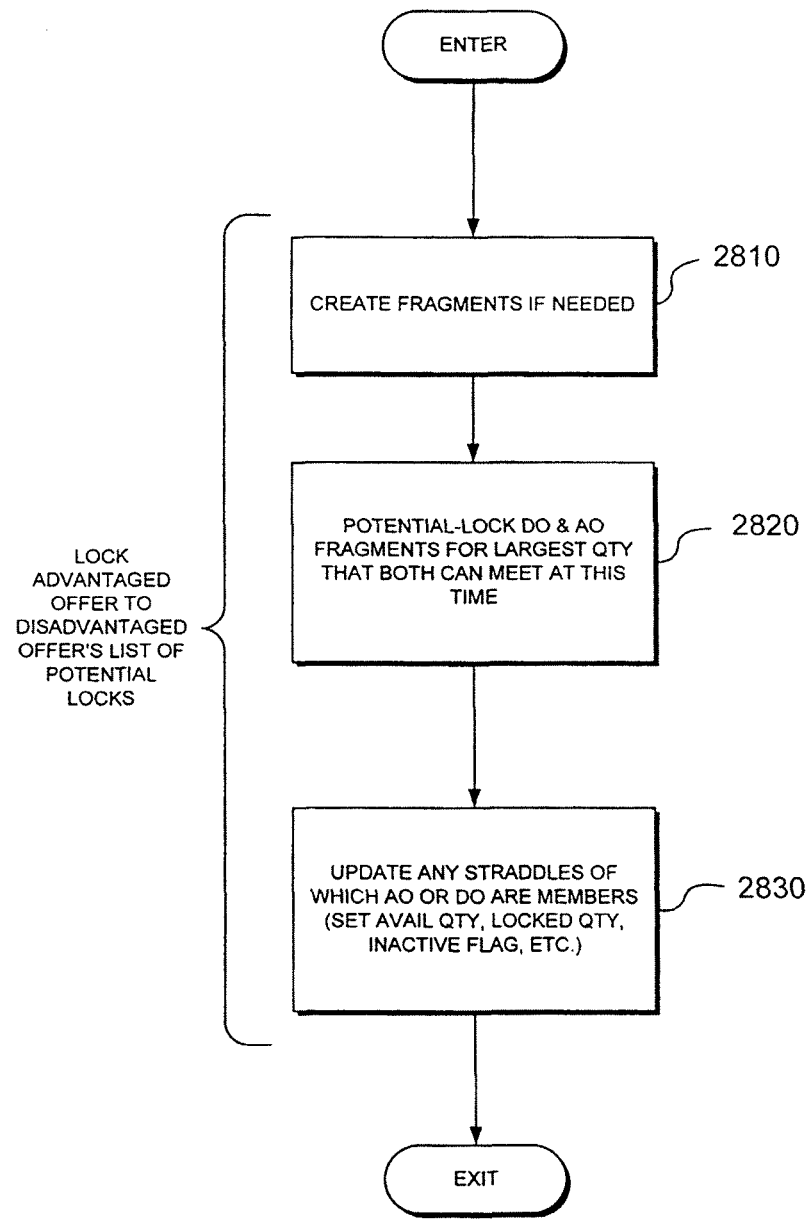
FIG. 28 is a flow diagram of a method consistent with the present invention of adding an advantaged offer to the list of potential locks associated with a disadvantaged offer.

FIG. 28 is a flow diagram of a method consistent with the present invention of adding an advantaged offer to the list of potential locks associated with a disadvantaged offer. Fragments are created if needed (step 2810). Next, corresponding fragments are flagged as potentially locked in the corresponding advantaged offers and disadvantaged offers for the largest quantity that both can meet at this time (step 2820). Next, any straddles of which the advantaged offer or the disadvantaged offer are members are updated, including setting the available quantity, locked quantity, and active/inactive flag, (step 2830).

Figure 29:
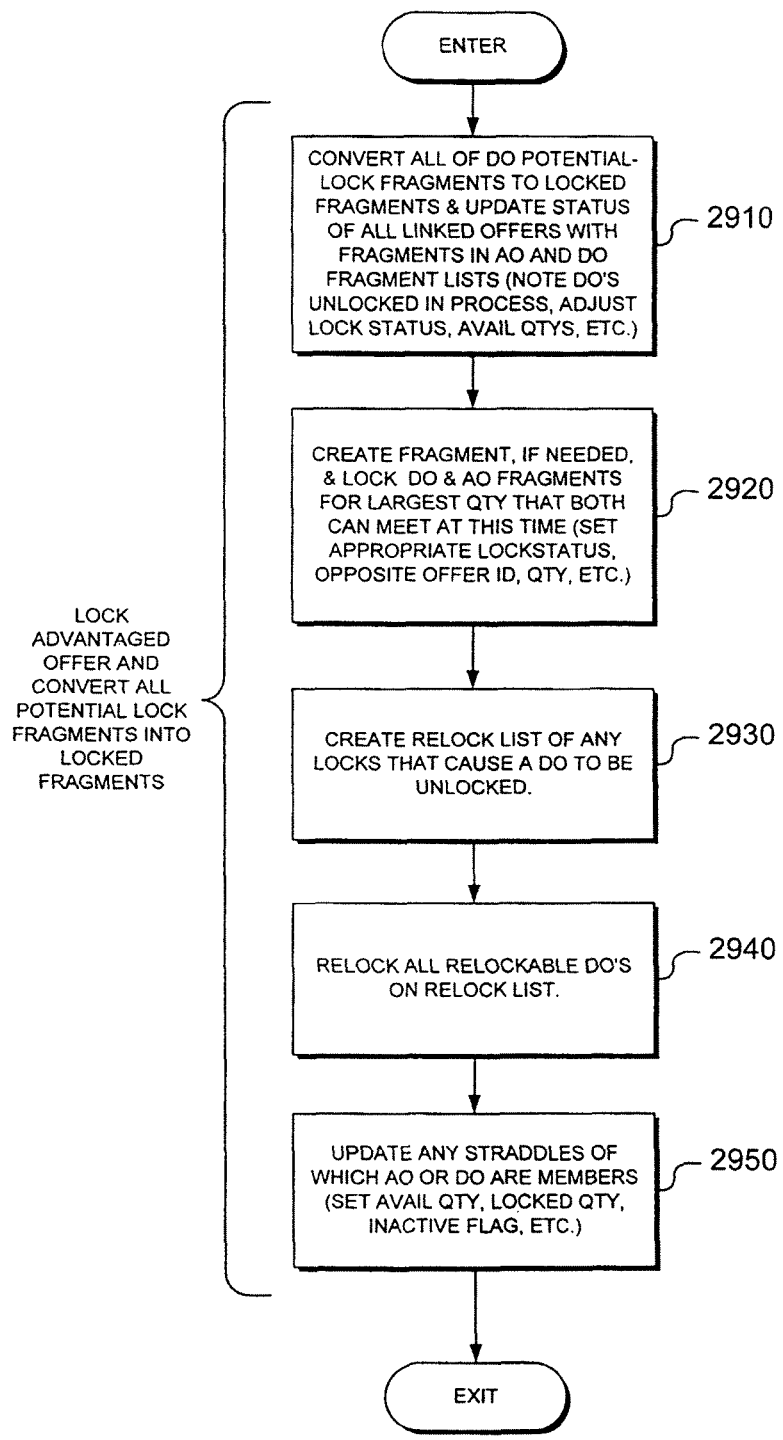
FIG. 29 is a flow diagram of a method consistent with the present invention of locking an advantaged offer and converting all potential lock fragments to locked fragments.

FIG. 29 is a flow diagram of a method consistent with the present invention of locking an advantaged offer and converting all potential-lock fragments to locked fragments. First the method converts all of the disadvantaged offer potential-lock fragments to locked fragments and updates the status of all linked offers with fragments in the advantaged offer and disadvantaged offer fragment lists, placing disadvantaged offers unlocked in the process on the relock list if appropriate, adjusting lock status, and available quantities (step 2910). Next, the method creates a fragment, if needed, and locks the disadvantaged offer and advantaged offer fragments for the largest quantity that both can meet at this time, setting the appropriate lock status, opposite offer ID, and quantity (step 2920). Next, the method creates a relock list of any locks that cause a disadvantaged offer to be unlocked (step 2930). Next the method relocks all relockable disadvantaged offers on the relock list (step 2940). Finally, the method updates any straddles of which the advantaged offer or disadvantaged offer are members, setting the available quantity, locked quantity, and active/inactive flag (step 2950).

It will be apparent to those skilled in the art that various modifications and variations can be made in the market-clearing system and methods consistent with the principles of the present invention without departing from the scope or spirit of the invention. Although several embodiments have been described above, other variations are possible consistent with the principles of the present invention.

The term "computer-readable medium" as used herein refers to any medium that may store instructions for execution. Such a medium may take many forms, including but not limited to, non-volatile memory media, volatile memory media, and transmission media. Non-volatile memory media includes, for example, optical or magnetic disks. Volatile memory media includes RAM. Transmission media includes, for example, coaxial cables, copper wire and fiber optics, including the wires. Transmission media can also take the form of acoustic or light waves, such as those generated during radio wave and infrared data communications.

Common forms of computer-readable media include, for example, a floppy disk, a flexible disk, hard disk, magnetic tape, or any other magnetic storage medium, a CD-ROM, DVD, any other optical medium, a RAM, a PROM, an EPROM, a FLASH-EPROM, any other memory chip or cartridge, a carrier wave as described below, or any other medium from which a computer can read and use.

Various forms of computer-readable media may be involved in carrying one or more sequences of instructions for execution to implement all or part of the cyclic cache described herein. For example, the instructions may initially be carried on a magnetic disk or a remote computer. The remote computer can load the instructions into its dynamic memory and send the instructions over a telephone line using a modem. A modem local to a computer system can receive the data on the telephone line and use an infrared transmitter to convert the data to an infrared signal. An infrared detector coupled to appropriate circuitry can receive the data carried in the infrared signal and place the data on a bus. The bus may carry data to a memory, from which a processor retrieves and executes the instructions. The instructions received by the memory may optionally be stored on a storage device either before or after execution by the processor.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. A computer-implemented method for clearing offers, each of which specifies conditions for acceptance, the method comprising:

receiving at an electronic network connected computer server, a plurality of advantaged offers each having a respective requested close time, wherein an advantaged offer is one which, once associated with a given disadvantaged offer, will be transacted upon, either in accordance with terms originally associated with the advantaged offer, or in accordance with better terms;

using the computer server, respectively associating individual advantaged offers with individual available most-favorable disadvantaged offers each having a respective requested close time, wherein the conditions of acceptance of the individual advantaged offers are met by respective disadvantaged offers;

using the computer server, changing the association of one of the individual associated advantaged offers to a newly available disadvantaged offer that offers more favorable terms than a currently associated disadvantaged offer, when the newly available disadvantaged offer is received and meets the conditions of acceptance of the associated advantaged offer, wherein the step of changing the association is performed in order of chronological priority of receipt of the advantaged offers;

at a predetermined time based on respective requested close times of associated individual advantaged offers and disadvantaged offers, clearing the associated individual advantaged offers and disadvantaged offers to produce cleared individual advantaged offers and disadvantaged offers; and transmitting, via the electronic network, transaction directives to transacting buyers and sellers associated respectively with the cleared individual advantaged offers and disadvantaged offers.

2. A method according to claim 1, wherein the advantaged and disadvantaged offers are each associated with a pool and a corresponding pool close event.

3. A method according to claim 1, wherein the specified conditions for acceptance of the offers have attributes related to terms of acceptance of that offer, and wherein determining which of the disadvantaged offers have more favorable specifications further comprises:

applying attributes of one of the advantaged offers to a price function for one of the disadvantaged offers to systematically calculate a price.

4. A method according to claim 3, wherein the calculated price includes all appropriate costs.

5. A method according to claim 3, wherein determining which of the disadvantaged offers have more favorable specifications further comprises:
applying a weighting function to the calculated price.

6. A method according to claim 3, wherein applying attributes of one of the advantaged offers comprises:
using as the price function a table in which price ranges correspond to attributes of an advantaged offer.

7. A method according to claim 3, wherein applying attributes of one of the advantaged offers comprises:
using as the price function a computer program configured to calculate a price based on attributes of the advantaged offer.

8. A method according to claim 1, wherein the specifications of conditions for acceptance of the offers include price specifications, and wherein determining which disadvantaged offers have more favorable specifications further comprises:
comparing price specifications.

9. A method according to claim 8, wherein the price specifications are constant prices, and wherein comparing the price specifications comprises:
comparing constant prices.

10. A method according to claim 1, wherein available disadvantaged offers comprise those disadvantaged offers that are not already associated with other offers.

11. A method according to claim 1, wherein the specifications of the conditions of acceptance of the advantaged offers further comprise:
a product specification, a quantity specification, a pool specification, and a fragment list; and wherein determining which disadvantaged offers have more favorable specifications includes:
examining the product specification, quantity specification, pool specification, and fragment list of the improvable offers.

12. A method according to claim 1, wherein the specifications of the conditions of acceptance of the disadvantaged offers further comprise:
a product specification, a quantity specification, a pool specification, and a fragment list; and wherein determining which disadvantaged offers have more favorable specifications includes:
examining the product specification, quantity specification, pool specification, and fragment list of the disadvantaged offers.

13. A method according to claim 11, wherein the quantity specification further comprises a minimum quantity and a maximum quantity; and wherein determining which disadvantaged offers have more favorable specifications includes:
examining the minimum and maximum quantities.

14. A method according to claim 12, wherein the quantity specification further comprises:
a minimum quantity and a maximum quantity; and wherein determining which disadvantaged offers have more favorable specifications includes:
examining the minimum and maximum quantities.

15. The method of claim 1, wherein the requested close time is established by an event.

16. The method of claim 1, wherein the advantaged offers are binding advantaged offers.

17. The method of claim 1, wherein the disadvantaged offers are binding disadvantaged offers.

18. A computer-implemented method for generating events to be posted to a marketplace, the method comprising:
receiving, at an electronic network connected computer server, a description of transactions to be offered in the marketplace;
using the computer server, expanding the description of transactions to be offered in the marketplace into at least one offer, with specified conditions of acceptance; and
using the computer server, generating a set of post events based on the at least one offer in a manner to cause the transactions to be offered in a marketplace in which a marketplace method for processing offers is used, and the marketplace method comprising:
receiving, at the electronic network connected computer server, a plurality of advantaged offers each having a respective requested close time, wherein an advantaged offer is one which, once associated with a given disadvantaged offer, will necessarily be transacted upon, either in accordance with terms originally associated with the advantaged offer, or in accordance with better terms;
using the computer server, respectively associating individual advantaged offers with individual available most-favorable disadvantaged offers each having a respective requested close time, wherein the conditions of acceptance of the individual advantaged offers are met by respective disadvantaged offers;
using the computer server, changing the association of one of the individual advantaged offers to a newly available disadvantaged offer that offers more favorable terms than a currently associated disadvantaged offer, when the newly available disadvantaged offer is received and meets the conditions of acceptance of the associated advantaged offer, wherein the step of changing the association is performed in order of chronological priority of receipt of the advantaged offers;
at a predetermined time based on respective requested close times of associated individual advantaged offers and disadvantaged offers, clearing the associated individual advantaged offers and disadvantaged offers to produce cleared individual advantaged offers and disadvantaged offers; and
transmitting, via the electronic network, transaction directives to transacting buyers and sellers associated respectively with the cleared individual advantaged offers and disadvantaged offers.

19. A method according to claim 18, wherein the description of transactions is a stepped-price schedule having price breaks at each price step in the stepped-price schedule, and wherein generating a set of post events includes:
generating an uninterruptible sequence of offers, each offer in the sequence corresponding to a price step in the stepped-price schedule, and each offer having a reserve price equal to the price break of the price step.

20. A method according to claim 18, wherein the description of transactions is an all-or-none specification having a minimum quantity, and wherein generating a set of post events includes:
posting an offer with a minimum quantity specification corresponding to the minimum quantity in the all-or-none specification.

21. A method according to claim 18, wherein the description of transactions is a fill-or-kill specification having a minimum quantity, and wherein generating a set of post events includes:
posting an offer with a minimum quantity specification corresponding to the minimum quantity in the fill-or-kill specification; and withdrawing the offer if the minimum quantity specification cannot be satisfied.

22. A method according to claim 18, wherein the description of transactions is a fill-and-withdraw specification having a desired quantity, and wherein generating a set of post events includes:
  posting an offer with a maximum quantity specification corresponding to the desired quantity in the fill-and-withdraw specification; and
  withdrawing any quantity of the offer not immediately filled.

23. A method according to claim 18, wherein receiving a description of offered transactions further includes: providing a user interface to specify products in the offer.

24. A method according to claim 18, wherein generating a set of post events further includes:
  generating offers contingent on the occurrence of an event.

25. The method of claim 18, wherein the requested close time is established by an event.

26. The method of claim 18, wherein the advantaged offers are binding advantaged offers.

27. The method of claim 18, wherein the disadvantaged offers are binding disadvantaged offers.

28. A computer-implemented method for generating events to be posted to a marketplace, the method comprising:
  receiving, at an electronic network connected computer server, a description of transactions to be offered in the marketplace;
  using the computer server, expanding the description of transactions to be offered in the marketplace into at least one offer, with specified conditions of acceptance; and
  using the computer server, generating a set of post events based on the at least one offer in a manner to cause the transactions to be offered in a marketplace in which a marketplace method for processing offers is used, and the marketplace method comprising:
  receiving, at the electronic network connected computer server, a plurality of advantaged offers, each having a respective requested close time;
  using the computer server, associating each advantaged offer with one or more available most-favorable disadvantaged offers each having a respective requested close time, wherein the conditions of acceptance of each advantaged offer are met by each disadvantaged offer that has been associated with the advantaged offer;
  using the computer server, changing the association of an advantaged offer to a newly available disadvantaged offer that offers more favorable terms than a currently associated disadvantaged offer, when the newly available disadvantaged offer is received and meets the conditions of acceptance of the associated advantaged offer;
  at a predetermined time based on respective requested close times of associated advantaged and disadvantaged offers, clearing the associated individual advantaged offers and disadvantaged offers to produce cleared individual advantaged offers and disadvantaged offers; and
  transmitting, via the electronic network, transaction directives to transacting buyers and sellers associated respectively with the cleared individual advantaged offers and disadvantaged offers,
  wherein the events include straddles specifying a straddle limit, which restricts the number of associations, and
  wherein generating a set of post events further comprises:
  creating an offer corresponding to one of the descriptions;
  adding the created offer to any corresponding straddles; and
  generating a straddle including the created offer if no corresponding straddles exist.

29. A method according to claim 28, further comprising the steps of:
  monitoring the marketplace for new opportunities to post an offer corresponding to offers in a posted straddle; and
  adding an offer corresponding to the new opportunity to the posted straddle.

30. The method of claim 28, wherein the advantaged offers are binding advantaged offers.

31. The method of claim 28, wherein the disadvantaged offers are binding disadvantaged offers.

\* \* \* \* \*